(12) United States Patent
Laberge et al.

(10) Patent No.: US 10,984,917 B2
(45) Date of Patent: Apr. 20, 2021

(54) SYSTEMS AND METHODS FOR COMPRESSING PLASMA

(71) Applicant: General Fusion Inc., Burnaby (CA)

(72) Inventors: Michel Georges Laberge, West Vancouver (CA); Douglas H. Richardson, Anmore (CA)

(73) Assignee: General Fusion Inc., Burnaby (CA)

( * ) Notice: Subject to any disclaimer, the term of this patent is extended or adjusted under 35 U.S.C. 154(b) by 592 days.

(21) Appl. No.: 15/872,585

(22) Filed: Jan. 16, 2018

(65) Prior Publication Data

US 2018/0190390 A1 Jul. 5, 2018

Related U.S. Application Data

(60) Division of application No. 15/200,919, filed on Jul. 1, 2016, now Pat. No. 9,875,816, which is a division of application No. 13/935,281, filed on Jul. 3, 2013, now Pat. No. 9,424,955, which is a continuation of application No. 12/699,725, filed on Feb. 3, 2010, now Pat. No. 8,537,958.

(60) Provisional application No. 61/149,886, filed on Feb. 4, 2009.

(51) Int. Cl.

| H05H 1/12 | (2006.01) |
|---|---|
| G21B 1/05 | (2006.01) |
| H05H 1/16 | (2006.01) |
| H05H 3/06 | (2006.01) |
| G21B 3/00 | (2006.01) |
| H05H 1/54 | (2006.01) |

(52) U.S. Cl.
CPC ............ G21B 1/057 (2013.01); G21B 3/008 (2013.01); H05H 1/16 (2013.01); H05H 1/54 (2013.01); H05H 3/06 (2013.01)

(58) Field of Classification Search
CPC ... G21B 1/00; G21B 1/03; G21B 1/05; G21B 1/055; G21B 1/057; G21B 1/11
See application file for complete search history.

(56) References Cited

U.S. PATENT DOCUMENTS

| 2,715,389 A | 8/1955 | Johnson |
| 2,939,048 A | 5/1960 | Waniek |
| 2,953,718 A | 9/1960 | Ducati |
| 2,991,238 A | 7/1961 | Phillips et al. |
| 2,992,345 A | 7/1961 | Hansen |
| 3,189,523 A | 6/1965 | Patrick |

(Continued)

FOREIGN PATENT DOCUMENTS

| CA | 2031841 | 6/1992 |
| CA | 2104939 | 4/1995 |

(Continued)

OTHER PUBLICATIONS

L.A. Artsimovich, "Controlled Thermonuclear Reactions", Gordon & Breach Science Publishers, New York (first English edition: 1964), New York, USA, in 6 pages.

(Continued)

*Primary Examiner* — Marshall P O'Connor
(74) *Attorney, Agent, or Firm* — Knobbe, Martens, Olson & Bear LLP

(57) ABSTRACT

Embodiments of systems and methods for compressing plasma are described in which plasma pressures above the breaking point of solid material can be achieved by injecting a plasma into a funnel of liquid metal in which the plasma is compressed and/or heated.

10 Claims, 7 Drawing Sheets

(56) References Cited

U.S. PATENT DOCUMENTS

| | | |
|---|---|---|
| 3,194,739 A | 7/1965 | Kerst et al. |
| 3,309,967 A | 3/1967 | Taplin |
| 3,313,707 A | 4/1967 | Amsler |
| 3,338,788 A | 8/1967 | Linhart |
| 3,341,189 A | 9/1967 | Rollin |
| 3,346,458 A | 10/1967 | Schmidt |
| 3,465,742 A | 9/1969 | Herr |
| 3,503,472 A | 3/1970 | Axthammer |
| 3,579,028 A | 5/1971 | Paine et al. |
| 3,624,239 A | 11/1971 | Fraas et al. |
| 3,631,760 A | 1/1972 | Moran |
| 3,748,226 A | 7/1973 | Ribe et al. |
| 3,753,304 A | 8/1973 | Hughes |
| 3,778,343 A | 12/1973 | Coppi et al. |
| 3,925,990 A | 12/1975 | Gross |
| 3,973,468 A | 8/1976 | Russell, Jr. |
| 3,983,303 A | 9/1976 | Biermann et al. |
| 3,990,351 A | 11/1976 | Sundin |
| 4,012,166 A | 3/1977 | Kaesser et al. |
| 4,023,065 A | 5/1977 | Koloc |
| 4,026,192 A | 5/1977 | Noren et al. |
| 4,049,367 A | 9/1977 | Tominaga et al. |
| 4,068,147 A | 1/1978 | Wells |
| 4,129,772 A | 12/1978 | Navratil et al. |
| 4,140,057 A | 2/1979 | Turchi et al. |
| 4,158,598 A | 6/1979 | Baird |
| 4,166,760 A | 9/1979 | Fowler et al. |
| 4,182,650 A | 1/1980 | Fischer |
| 4,196,788 A | 4/1980 | Sciard |
| 4,207,154 A | 6/1980 | Lemelson |
| 4,217,171 A | 8/1980 | Schaffer |
| 4,228,380 A | 10/1980 | Wells |
| 4,252,605 A | 2/1981 | Schaffer |
| 4,257,798 A | 3/1981 | Hendricks et al. |
| 4,263,095 A | 4/1981 | Thode |
| 4,269,658 A | 5/1981 | Ohkawa |
| 4,269,659 A | 5/1981 | Goldberg |
| 4,277,305 A | 7/1981 | Bohachevsky |
| 4,284,164 A | 8/1981 | Airhart |
| 4,290,848 A | 9/1981 | Sudan |
| 4,292,126 A | 9/1981 | Ohkawa |
| 4,292,568 A | 9/1981 | Wells et al. |
| 4,304,627 A | 12/1981 | Lewis |
| 4,305,784 A | 12/1981 | Ohkawa |
| 4,328,070 A | 5/1982 | Winterberg |
| 4,333,796 A | 6/1982 | Flynn |
| 4,342,720 A | 8/1982 | Wells |
| 4,363,775 A | 12/1982 | Bussard et al. |
| 4,367,130 A | 1/1983 | Lemelson |
| 4,385,880 A | 5/1983 | Lemelson |
| 4,390,322 A | 6/1983 | Budzick |
| 4,435,354 A | 3/1984 | Winterberg |
| 4,449,892 A | 5/1984 | Bentley |
| 4,454,850 A | 6/1984 | Horvath |
| 4,534,263 A | 8/1985 | Heyne et al. |
| 4,563,341 A | 1/1986 | Flynn |
| 4,625,681 A | 12/1986 | Sutekiyo |
| 4,643,854 A | 2/1987 | Kendall, Jr. et al. |
| 4,687,045 A | 8/1987 | Roller |
| 4,735,762 A | 4/1988 | Lasche |
| 4,761,118 A | 8/1988 | Zanarini |
| 4,790,735 A | 12/1988 | Mayer |
| 4,930,355 A | 6/1990 | Heck |
| 5,015,432 A | 5/1991 | Koloc |
| 5,041,760 A | 8/1991 | Koloc |
| 5,087,435 A | 2/1992 | Potter et al. |
| 5,114,261 A | 5/1992 | Sugimoto et al. |
| 5,160,695 A | 11/1992 | Bussard |
| 5,227,239 A | 7/1993 | Upadhye et al. |
| 5,305,091 A | 4/1994 | Gelbart et al. |
| 5,394,131 A | 2/1995 | Lungu |
| 5,397,961 A | 3/1995 | Ayers et al. |
| 5,429,030 A | 7/1995 | Tidman |
| 5,430,776 A | 7/1995 | Stauffer et al. |
| 5,526,885 A | 6/1996 | Kuvshinov et al. |
| 5,659,173 A | 8/1997 | Putterman et al. |
| 5,811,944 A | 9/1998 | Sampayan et al. |
| 5,818,498 A | 10/1998 | Richardson et al. |
| 5,821,705 A | 10/1998 | Sampayan et al. |
| 5,858,104 A | 1/1999 | Clark |
| 5,920,394 A | 7/1999 | Gelbart et al. |
| 5,923,716 A | 7/1999 | Meacham |
| 6,141,395 A | 10/2000 | Nishimura et al. |
| 6,181,362 B1 | 1/2001 | Laberge |
| 6,235,067 B1 | 5/2001 | Ahern et al. |
| 6,252,622 B1 | 6/2001 | Laberge |
| 6,377,739 B1 | 4/2002 | Richardson |
| 6,396,213 B1 | 5/2002 | Koloc |
| 6,408,052 B1 | 6/2002 | McGeoch |
| 6,411,666 B1 | 6/2002 | Woolley |
| 6,418,177 B1 | 7/2002 | Stauffer et al. |
| 6,477,216 B2 | 11/2002 | Koloc |
| 6,532,887 B1 | 3/2003 | Venier et al. |
| 6,587,211 B1 | 7/2003 | Gelbart |
| 6,593,539 B1 | 7/2003 | Miley et al. |
| 6,611,106 B2 | 8/2003 | Monkhorst et al. |
| 6,628,740 B2 | 9/2003 | Monkhorst et al. |
| 6,654,433 B1 | 11/2003 | Boscoli et al. |
| 6,660,997 B2 | 12/2003 | Laberge et al. |
| 6,664,740 B2 | 12/2003 | Rostoker et al. |
| 6,665,048 B2 | 12/2003 | Gelbart |
| 6,680,480 B2 | 1/2004 | Schoen |
| 6,729,277 B2 | 5/2004 | Yamaki et al. |
| 6,763,160 B2 | 7/2004 | Laberge et al. |
| 6,784,591 B2 | 8/2004 | Baker |
| 6,832,552 B2 | 12/2004 | Patten et al. |
| 6,837,145 B1 | 1/2005 | McBride et al. |
| 6,842,553 B2 | 1/2005 | Richardson |
| 6,850,011 B2 | 2/2005 | Monkhorst et al. |
| 6,852,942 B2 | 2/2005 | Monkhorst et al. |
| 6,853,141 B2 | 2/2005 | Hoffman et al. |
| 6,870,894 B2 | 3/2005 | Lou et al. |
| 6,888,434 B2 | 5/2005 | Nordberg |
| 6,888,907 B2 | 5/2005 | Monkhorst et al. |
| 6,891,911 B2 | 5/2005 | Rostoker et al. |
| 6,894,446 B2 | 5/2005 | Monkhorst et al. |
| 6,941,035 B2 | 9/2005 | Laberge et al. |
| 6,995,515 B2 | 2/2006 | Rostoker et al. |
| 7,002,148 B2 | 2/2006 | Monkhorst et al. |
| 7,015,646 B2 | 3/2006 | Rostoker et al. |
| 7,026,763 B2 | 4/2006 | Rostoker et al. |
| 7,079,001 B2 | 7/2006 | Nordberg |
| 7,100,494 B2 | 9/2006 | Petersen et al. |
| 7,119,491 B2 | 10/2006 | Rostoker et al. |
| 7,126,284 B2 | 10/2006 | Rostoker et al. |
| 7,129,656 B2 | 10/2006 | Rostoker et al. |
| 7,173,385 B2 | 2/2007 | Caporaso et al. |
| 7,180,082 B1 | 2/2007 | Hassanein et al. |
| 7,180,242 B2 | 2/2007 | Rostoker et al. |
| 7,230,201 B1 | 6/2007 | Miley et al. |
| 7,232,985 B2 | 6/2007 | Monkhorst et al. |
| 7,260,462 B2 | 8/2007 | Kiem et al. |
| 7,372,059 B2 | 5/2008 | Shumiak et al. |
| 7,391,160 B2 | 6/2008 | Monkhorst et al. |
| 7,439,678 B2 | 10/2008 | Rostoker et al. |
| 7,459,654 B2 | 12/2008 | Monkhorst et al. |
| 7,477,718 B2 | 1/2009 | Rostoker et al. |
| 7,482,607 B2 | 1/2009 | Lerner et al. |
| 7,486,758 B1 | 2/2009 | Turchi |
| 7,501,640 B2 | 3/2009 | Larson |
| 7,550,741 B2 | 6/2009 | Sanns |
| 7,559,542 B2 | 7/2009 | Cotter |
| 7,569,995 B2 | 8/2009 | Rostoker et al. |
| 7,576,499 B2 | 8/2009 | Caporaso et al. |
| 7,613,271 B2 | 11/2009 | Rostoker et al. |
| 7,619,232 B2 | 11/2009 | Schmidt et al. |
| 7,679,025 B2 | 3/2010 | Krishnan et al. |
| 7,679,027 B2 | 3/2010 | Bogatu |
| 7,719,199 B2 | 5/2010 | Monkhorst et al. |
| 7,825,391 B2 | 11/2010 | Shumlak et al. |
| 7,831,008 B2 | 11/2010 | Perkins et al. |
| 7,955,986 B2 | 6/2011 | Hoffman et al. |
| 7,973,296 B2 | 7/2011 | Quick |
| 8,031,824 B2 | 10/2011 | Bystritskii et al. |

(56) References Cited

U.S. PATENT DOCUMENTS

| | | |
|---|---|---|
| 8,059,779 B2 | 11/2011 | Greatbatch |
| 8,090,071 B2 | 1/2012 | DeLuze |
| 8,139,287 B2 | 3/2012 | Winterberg |
| 8,279,994 B2 | 10/2012 | Kotschenreuther et al. |
| 8,537,958 B2 | 9/2013 | Laberge et al. |
| 8,617,351 B2 | 12/2013 | Hoffman et al. |
| 8,887,618 B2 | 11/2014 | McIlwraith et al. |
| 8,891,719 B2 | 11/2014 | Howard et al. |
| 8,994,271 B2 | 3/2015 | Kindel et al. |
| 9,267,515 B2 | 2/2016 | Suponitsky et al. |
| 9,271,383 B2 | 2/2016 | Howard et al. |
| 9,424,955 B2 | 8/2016 | Laberge et al. |
| 9,463,478 B2 | 10/2016 | Suponitsky et al. |
| 9,596,745 B2 | 3/2017 | Laberge et al. |
| 9,875,816 B2 | 1/2018 | Laberge et al. |
| 2002/0057754 A1 | 5/2002 | Stauffer et al. |
| 2002/0090047 A1 | 7/2002 | Stringham |
| 2003/0024476 A1 | 2/2003 | Rostoker et al. |
| 2003/0074010 A1 | 4/2003 | Taleyarkhan |
| 2003/0215046 A1 | 11/2003 | Hornkohl |
| 2004/0079287 A1 | 4/2004 | Smith et al. |
| 2004/0141578 A1 | 7/2004 | Enfinger |
| 2005/0001556 A1 | 1/2005 | Hoffman et al. |
| 2005/0129161 A1 | 6/2005 | Laberge |
| 2005/0271181 A1 | 12/2005 | Winterberg |
| 2006/0039519 A1 | 2/2006 | Rostoker et al. |
| 2006/0076897 A1 | 4/2006 | Rostoker et al. |
| 2006/0198483 A1 | 9/2006 | Laberge |
| 2006/0198486 A1 | 9/2006 | Laberge et al. |
| 2006/0198487 A1 | 9/2006 | Laberge |
| 2006/0254520 A1 | 11/2006 | Rostoker et al. |
| 2006/0267504 A1 | 11/2006 | VanDrie et al. |
| 2007/0058770 A1 | 3/2007 | Fissenko et al. |
| 2007/0096659 A1 | 5/2007 | Monkhorst et al. |
| 2007/0145018 A1 | 6/2007 | Smith et al. |
| 2007/0158534 A1 | 7/2007 | Monkhorst et al. |
| 2007/0172017 A1 | 7/2007 | Rostoker et al. |
| 2007/0211841 A1 | 9/2007 | Tomory |
| 2008/0008286 A1 | 1/2008 | Jacobson |
| 2008/0063132 A1 | 3/2008 | Birnbach |
| 2008/0187086 A1 | 8/2008 | Bussard |
| 2008/0205573 A1 | 8/2008 | Larson |
| 2008/0251502 A1 | 10/2008 | Monkhorst et al. |
| 2009/0059718 A1 | 3/2009 | Tessien |
| 2009/0152094 A1 | 6/2009 | Fissenko et al. |
| 2009/0213975 A1 | 8/2009 | Sturt |
| 2009/0213976 A1 | 8/2009 | Gioscia et al. |
| 2009/0290673 A1 | 11/2009 | Svidzinski |
| 2009/0310731 A1 | 12/2009 | Burke et al. |
| 2010/0066252 A1 | 3/2010 | Reijonen et al. |
| 2010/0067639 A1 | 3/2010 | Sturt |
| 2010/0104058 A1 | 4/2010 | Birnbach |
| 2010/0150291 A1 | 6/2010 | Jung et al. |
| 2010/0163130 A1 | 7/2010 | Laberge et al. |
| 2010/0202580 A1 | 8/2010 | Wurden et al. |
| 2010/0206847 A1 | 8/2010 | Chen et al. |
| 2010/0215136 A1 | 8/2010 | Rusnak et al. |
| 2010/0284501 A1 | 11/2010 | Rogers |
| 2010/0329407 A1 | 12/2010 | Kotschenreuther et al. |
| 2011/0007860 A1 | 1/2011 | Sanders, Jr. |
| 2011/0019789 A1 | 1/2011 | Rostoker et al. |
| 2011/0026657 A1 | 2/2011 | Laberge et al. |
| 2011/0044416 A1 | 2/2011 | Cabello et al. |
| 2011/0064179 A1 | 3/2011 | Birnback |
| 2011/0075783 A1 | 3/2011 | Mcgervey et al. |
| 2011/0085632 A1 | 4/2011 | Klein et al. |
| 2011/0091004 A1 | 4/2011 | Farmer et al. |
| 2011/0142185 A1 | 6/2011 | Woodruff |
| 2011/0158369 A1 | 6/2011 | Larson |
| 2011/0170647 A1 | 7/2011 | Bussard |
| 2011/0188622 A1 | 8/2011 | Shrier |
| 2011/0200153 A1 | 8/2011 | Ferreira, Jr. |
| 2011/0216866 A1 | 9/2011 | Pearson |
| 2011/0243292 A1 | 10/2011 | Howard et al. |
| 2011/0253682 A1 | 10/2011 | Gutman |
| 2011/0261918 A1 | 10/2011 | Schmidt |
| 2011/0261919 A1 | 10/2011 | Sefcik et al. |
| 2011/0274228 A1 | 11/2011 | Lopez |
| 2011/0286563 A1 | 11/2011 | Moses et al. |
| 2011/0286570 A1 | 11/2011 | Farmer et al. |
| 2011/0293056 A1 | 12/2011 | Slough |
| 2012/0002773 A1 | 1/2012 | Hunter, Jr. et al. |
| 2012/0008728 A1 | 1/2012 | Fleming |
| 2012/0014491 A1 | 1/2012 | Deeth |
| 2012/0031070 A1 | 2/2012 | Slough et al. |
| 2012/0033775 A1 | 2/2012 | Santilli |
| 2012/0039431 A1 | 2/2012 | Schmidt et al. |
| 2012/0057665 A1 | 3/2012 | Moses et al. |
| 2012/0076253 A1 | 3/2012 | Howard, Jr. |
| 2012/0085920 A1 | 4/2012 | Guethlein |
| 2012/0086364 A1 | 4/2012 | Guethlein |
| 2012/0114088 A1 | 5/2012 | Amendt et al. |
| 2012/0152722 A1 | 6/2012 | Birnbach et al. |
| 2012/0155591 A1 | 6/2012 | Freeze |
| 2013/0270747 A1 | 10/2013 | Tranter et al. |
| 2015/0021339 A1 | 1/2015 | Felts et al. |
| 2015/0152899 A1 | 6/2015 | McIlwraith et al. |
| 2016/0129142 A1 | 5/2016 | Nettesheim |
| 2016/0150627 A1 | 5/2016 | Howard et al. |

FOREIGN PATENT DOCUMENTS

| | | |
|---|---|---|
| CA | 2124364 | 11/1995 |
| CA | 2262581 | 2/1998 |
| CA | 2477960 | 2/2004 |
| CA | 2750441 | 4/2012 |
| CH | 607236 | 11/1978 |
| DE | 2516296 | 10/1975 |
| EP | 0662693 | 7/1995 |
| EP | 2460160 B1 | 6/2013 |
| GB | 774052 | 6/1954 |
| GB | 825026 | 12/1959 |
| JP | S38-001269 | 2/1963 |
| JP | 50-120100 | 9/1975 |
| JP | S55-501066 | 12/1980 |
| JP | 58-22675 | 2/1983 |
| JP | S59-090078 | 5/1984 |
| JP | S61-116683 | 6/1986 |
| JP | H03-067196 A | 3/1991 |
| JP | 03226694 A | 10/1991 |
| JP | 06317684 A | 11/1994 |
| JP | H06-511518 | 12/1994 |
| JP | H07-174876 | 7/1995 |
| JP | H07-201497 | 8/1995 |
| JP | H09-189786 | 7/1997 |
| JP | H11-144890 | 5/1999 |
| JP | 2004-335479 | 11/2004 |
| JP | 2006-310101 | 11/2006 |
| WO | WO 80/00045 | 1/1980 |
| WO | WO 90/13129 | 11/1990 |
| WO | WO 90/13136 | 11/1990 |
| WO | WO 90/14670 | 11/1990 |
| WO | WO 91/10242 | 7/1991 |
| WO | WO 91/13531 | 9/1991 |
| WO | WO 93/23587 | 11/1993 |
| WO | WO 94/16446 | 7/1994 |
| WO | WO 95/03611 | 2/1995 |
| WO | WO 95/16995 | 6/1995 |
| WO | WO 96/21230 | 7/1996 |
| WO | WO 96/36969 | 11/1996 |
| WO | WO 97/49274 | 12/1997 |
| WO | WO 99/56284 | 11/1999 |
| WO | WO 01/39197 | 5/2001 |
| WO | WO 01/39198 A2 | 5/2001 |
| WO | WO 01/39199 A2 | 5/2001 |
| WO | WO 01/39200 A2 | 5/2001 |
| WO | WO 01/39201 A2 | 5/2001 |
| WO | WO 01/39202 A2 | 5/2001 |
| WO | WO 01/39203 A2 | 5/2001 |
| WO | WO 01/39204 A2 | 5/2001 |
| WO | WO 01/39205 A2 | 5/2001 |
| WO | WO 01/39206 A2 | 5/2001 |
| WO | WO 02/05292 | 1/2002 |
| WO | WO 02/097823 | 12/2002 |

(56) References Cited

FOREIGN PATENT DOCUMENTS

| | | |
|---|---|---|
| WO | WO 03/034441 | 4/2003 |
| WO | WO 03/077260 | 9/2003 |
| WO | WO 2010/114360 A1 | 10/2010 |
| WO | WO 2011/014577 | 2/2011 |
| WO | WO 2011/084903 A1 | 7/2011 |
| WO | WO 2011/154172 A1 | 12/2011 |
| WO | WO 2011/154717 A1 | 12/2011 |
| WO | WO 2012/037488 A1 | 3/2012 |
| WO | WO 2012/064746 A1 | 5/2012 |
| WO | WO 2012/064767 A1 | 5/2012 |
| WO | WO 2012/064773 A1 | 5/2012 |
| WO | WO 2012/103548 A1 | 8/2012 |
| WO | WO 2012/113057 A1 | 8/2012 |
| WO | WO 2014/032186 A1 | 3/2014 |
| WO | WO 2016/026040 A1 | 2/2016 |

OTHER PUBLICATIONS

J.E.Barton et al., "Closed-loop control of the safety factor profile in the TCV Tokamak", 53rd IEEE Conference on Decision and Control, Dec. 15-17, 2014, Los Angeles, California, pp. 5660-5665.
B. Bauer et al., "Magnetized High Energy Density Laboratory Plasmas," https://fusionenergy.lanl.gov/mhedlp-wp.pdf, Apr. 20, 2007, in 24 pages.
Bellan, P.M., "Spheromaks: A practical applicationo f magnetohydrodynamic dynamos and plasma self-organization," Imperial College Press, 2000, pp. 1-9, 268-275.
L. Bertolini et al., "Sharp, a first step towards a full sized Jules Verne Launcher", Lawrence Livermore National Lab; OSTI ID: 10125664; Legacy ID: DE94007029 Report No. UCRL-JC--114041; Conf-9305233—2, May 1, 1993, Issue Conf-9305233—2, in 15 pages.
D. Bohm, "Quantum Mechanics", Dover Ed, 1989, pp. 277-281.
D. Braaten, "Ridiculously easy test yields claim of energy triumph", Washington Times, Mar. 24, 1989.
Brenner et al, "Single-bubble Sonoluminescence", Reviews on Modern Physics, Apr. 2002, vol. 74, pp. 425-484.
Brown, M.W., "New Shot at Cold Fusion by Pumping Sound Waves into Tiny Bubbles," New York Times, Dec. 20, 1994.
Browning, P.K. et al., "Power Flow in a Gun-Injected Spheromak Plasma", The American Physical Society, Physical Review Letters, vol. 68, No. 11, Mar. 16, 1992, pp. 1718-1721.
F.Crisanti et al., "Active control of the plasma current profile on Jet Experiments", 30th Conference on Contr. Fusion and Plasma Phys., St. Petersburg, Jul. 7-11, 2003, ECA vol. 27A, P-2.88, in 4 pages.
L. Crum, "Sonoluminescence and Acoustic Inertial Confinement", Fifth International Symposium on Cavitation, Nov. 1-4, 2003, Osaka , Japan, in 4 pages.
J. H. Degnan et al, "Compression of compact toroids in conical-coaxial geometry", Fusion Technology, Mar. 1995, vol. 27, Issue 2, pp. 107-114.
J. H. Degnan et al., "Compact toroid formation, compression, and acceleration", Phys. Fluids B, Aug. 1993, vol. 5 , Issue 8, pp. 2938-2958.
M. Delage et al., "Progress Towards Acoustic Magnetized Target Fusion: An Overview of the R&D Program at General Fusion", 33rd Ann. Conf. Can. Nuc. Soc., Jun. 2012, in 13 pages.
R.C. Duck et al., "Structure of the n = 1 responsible for relaxation and current drive during sustainment of the SPHEX spheromak", Plasma Physics and Controlled Fusion, vol. 39, No. 5, May 1997, 715-736.
Thomas S. Duffy et al., "Compressional sound velocity, equation of state, and constitutive response of shock-compressed magnesium-oxide", Journal of Geophysical Research, vol. 100, No. B1, Jan. 10, 1995, pp. 529-542.
J. Eddleman et al., "Final Report on the LLNL Compact Torus Acceleration Project," Lawrence Livermore National Laboratory, UCRL-ID-120238, Mar. 19, 1995, in 62 pages.
D. Foley, "Star in a Jar", Popular Science, Dec. 198.

V. Fortov, "Nonideal plasma under extreme conditions generated by shock waves", Plasma Phys. Control, Fusion, Issue 45, pp. A1-A16 (2003).
T.K. Fowler, "Pulsed Spheromak Fusion Reactors", Comments on Plasma Physics & Controlled Fusion, Comments on Modern Physics, vol. 1(3), Part C, 1999, pp. 83-98.
T.K. Fowler, "Pulsed Spheromak Reactor With Adiabatic Compression", Lawrence Livermore National Laboratory, Mar. 29, 1999, in 13 pages.
T.K. Fowler, "Stability of Spheromaks Compressed by Liquid Walls", Lawrence Livermore National Laboratory, Aug. 17, 1999, in 9 pages.
H.P. Furth, "The Tokamak", in Fusion, vol. 1, Magnetic Confinement, Part A. ed. Edward Teller, Academic Press, pp. 123-242, 1981.
J. D. Graham et. al., "Shiva Star—Marauder Compact Torus System," Digest of Technical Papers, 8th IEEE International, Pulsed Power Conference, Jun. 1991 pp. 990-993.
J. H. Hammer et al, "Experimental demonstration of acceleration and focusing of magnetically confined plasma rings", Physical Review Letters, Dec. 19, 1988, vol. 61, Issue 25, pp. 2843-2846.
C. W. Hartman et al, "A Compact Torus Fusion Reactor Utilizing a Continuously Generated String of CT's. The CT String Reactor, CTSR", Journal of Fusion Energy (2008), Nov. 2, 2007 published online, Issue 27, pp. 44-48.
C. W. Hartman et al, "Acceleration of Spheromak Toruses, Experimental results and fusion applications", OSTI ID: 5240480; DE90005312, Proceedings of 11th US/Japan workshop on field-reversed configurations and compact toroids; Nov. 7-9, 1989, Dec. 1, 1989, Los Alamos, NM, USA.
C. W. Hartman et al., "Acceleration of Compact Toroid Plasma Rings for Fusion Applications," Lawrence Livermore National Laboratory, UCRL-98504, Prepared for Submittal to IAEA 12th International Conference on Plasma Physics and Controlled Nuclear Fusion Research in Nice, France, Oct. 12-19, 1988, in 16 pages.
C.W. Hartman et al., "Acceleration of Compact Toruses and Fusion Applications", Workshop on Physics of Alternative Magnetic Confinement Schemes, UCRL-JC-106121 Preprint, Oct. 11, 1990, Issue UCRL-JC-106121 Prepr, Varenna, Italy.
C.W. Hartman et al., "Acceleration of Compact Torus Plasma Rings in a Coaxial Rail-Gun", 7th Symposium on Compact Toroid Research, Santa Fe, New Mexico, May 21-23, 1985, in 6 pages.
R.S. Hawke, "Design and Analysis of Isentropic Compression Experiments", Lawrence Livermore Laboratory, Preprint UCRL-81797, May 7, 1979, in 23 pages.
D.N. Hill et al., "Field and Current Amplification in the SSPX Spheromak", 19th IAEA Fusion Energy Conference, Oct. 8, 2002, in 8 pages.
Robert S. Hixson et al., "Shock Compression Techniques for Developing Multiphase Equations of State", Los Alamos Science, No. 28, Jan. 2003, pp. 114-119.
S. Howard et al., "Development of merged compact toroids for use as a magnetized target fusion plasma", Journal of Fusion Energy, Nov. 11, 2008, vol. 28, No. 2, pp. 156-161, available Jun. 2008.
S.C. Hsu et al, "On the Jets, Kinks, and Spheromaks Formed by a Planar Magnetized Coaxial Gun", California Institute of Technology, Pasadena, CA 91125, Feb. 2, 2008, pp. 1-16.
C.E.Kessel, "Control of plasma profiles in a Tokamak, NSF Workshop on Mathematical Modeling and Control of Plasma in Magnetic Fusion", General Atomics, May 11-12, 2006, in 20 pages.
C.E.Kessel et al., "Simulations and Experiments on Modifying the q-Profile for Advanced Tokamak Discharges on Alcator C-Mod", APS Division of Plasma Physics, Nov. 2007, in 40 pages.
R.C. Kirkpatrick, "Assessment of the Acoustically Driven MTF Experiments being conducted by Dr. Michel Laberge of General Fusion, Inc.," May 2007, in 3 pages.
Kiuttu, G.F., et al., "Acceleration and compression of compact toroid plasmas," 1994 10th International Conference on High-Power Particle Beams, IET, vol. 1, pp. 150-158, Jun. 1994.
Ronald Allen Knief, Nuclear Engineering, Hemisphere Publishing Corp., 1992, pp. 640-643.

(56) References Cited

OTHER PUBLICATIONS

Thomas W. Kornack, "Magnetic Reconnection Studies on SSX", Swarthmore College Department of Physics and Astronomy, Swarthmore, PA, USA, Jun. 10, 1998, pp. 2-56.

R.G. Kraus et al., "Equation of state of ductile granular materials", DYMAT International Conference on Mechanical and Physical Behaviour of Materials, Sep. 2009, pp. 1317-1323.

Michel Laberge, "Acoustic Wave Driven MTF Fusion Reactor," Mar. 2007, in 20 pages.

Michel Laberge, "An Acoustically Driven Magnetized Target Fusion Reactor," Journal of Fusion Energy, vol. 27, Nos. 1-2, Jul. 11, 2007, pp. 65-68.

Michel Laberge, "Evidence of Fusion Products in Acoustically Driven MTF," Mar. 2007, in 41 pages.

Michel Laberge, "Experimental Results for an Acoustic Driver for MTF," Journal of Fusion Energy, Jun. 2009, vol. 28, Nos. 2, pp. 179-182, available Jun. 2008.

J.D. Lawson, "Some Criteria for a Power Producing Thermonuclear Reactor", Proc. Phys. Soc, 1957, Issue B70, pp. 6-10.

D. Liu et al., "Bench Test and Preliminary Results of Vertical Compact Torus Injection Experiments on the STOR-M Tokamak", Nuclear Fusion 46 (006), Dec. 16, 2005, pp. 104-109.

Logan, B.G., et al., "Compact Torus Accelerator Driven Inertial Confinement Fusion Power Plant Hylife-CT," Lawrence Livermore National Laboratory, UCRL-TR-211025, Apr. 1, 2005, in 85 pages.

Ch. Mangeant et al., "Syrinx Project: Compact Pulse-Current Generators Devoted to Material Study Under Isentropic Compression Loading", in Pulsed Power Plasma Science, IEEE, Jun. 2001, in 4 pages.

T. E. Markusic et al., "Visualization of Current Sheet Canting in a Pulsed Plasma Accelerator", IEPC-99-206, 26th International Electric Propulsion Conference in Kitakyushu, Japan, Oct. 17-21, 1999, in 8 pages.

B. E. McDonald, "Modeling nonlinear compressional waves in marine sediments", Nonlin. Processes Geophys., vol. 16, Feb. 26, 2009, pp. 151-157.

H. S. McLean et al, "Design and operation of a passively switched repetitive compact toroid plasma accelerator", Fusion Technology, May 1998, vol. 33, pp. 252-272.

D.J. Meeker et al., "A High Efficiency I.C.F. Driver Employing Magnetically Confined Plasma Rings", Lawrence Livermore National Laboratory, Sixth Topical Meeting on the Technology of Fusion Energy, San Francisco, California, Mar. 3-7, 1985, in 8 pages.

Gregory H. Miller et al., "The Equation of State of a Molten Komatiite 1. Shock Wave Compression to 36 GPa", Journal of Geophysical Research, vol. 96, No. B7, Jul. 10, 1991, pp. 11,831-11,848.

R. L. Miller and R. A. Krakowski, "Assessment of the slowly-imploding liner (LINUS) fusion reactor concept", Los Alamos Scientific Laboratory, Oct. 1980, Issue Rept. No. LA-UR-80-3, Los Alamos, NM, USA, in 10 pages.

J. Miyazawa et al., "Design of Spheromak Injector Using Conical Accelerator for Large Helical Device", Fusion Engineering and Design 54 (2001), pp. 1-12.

Y. Mizuno et al., "A Rectangular Pulse Vertical Field Circuit for a Small Tokamak", Electrical Engineering in Japan, vol. 133, No. 4, 2000, Translated from Denki Gakkai Ronbunshi, vol. 119 A, No. 12, Dec. 1999, pp. 1390-1396.

R. W. Moir et al., "Hylife-II: An approach to a long-lived, first-wall component for inertial fusion power plants", Lawrence Livermore National Lab, Aug. 1, 1994, vol. Report No. UCRL-J, Issue Conf-940933-46, in 15 pages.

Moss et al, "Hydrodynamic Simulations of Bubble Collapse and Picosecond Sonoluminescence", The Physics of Fluid, 1994, vol. 6, Issue 9, pp. 2979-2985.

W.J. Nellis et al., "Equation of state of shock-compressed liquids: Carbon dioxide and air", American Institute of Physics, J. Chem. Phys., vol. 95 (7), Oct. 1, 1991, pp. 5268-5272.

J. Nguyen et al., "Specifically Prescribed Dynamic Thermodynamic Paths and Resolidification Experiments", Lawrence Livermore National Laboratory, UCRL-JRNL-201169, Nov. 25, 2003, in 8 pages.

G. Olynyk et al., "Development of a Compact Toroid Fuelling System for ITER", Nuclear Fusion, vol. 48, No. 9, Sep. 2008, in 11 pages.

G. M. Olynyk, "Design and evaluation of a repetitive-fire compact toroid fuelling system for ITER," thesis submitted to the Department of Physics, Queen's University, Ontario, Canada, Mar. 2007, in 48 pages.

D. Orlikowski et al., "New experimental capabilities and theoretical insights of high pressure comrpession waves", Lawrence Livermore National Laboratory, UCRL-PROC-233023, Jul. 24, 2007, in 10 pages.

R. E. Peterkin, Jr., "Direct electromagnetic acceleration of a compact toroid to high density and high speed", Physical Review Letters, Apr. 17, 1995, vol. 74, Issue 16, pp. 3165-3168.

A. Prosperetti, "No Nuclear Fusion' from glowing bubbles", Chemistry & Industry News, http://ci.mond.org/9708/970810.html, Apr. 21, 2007.

V.V. Prut et al., "Metallic Z-pinch method: the isentropic comression of hydrogen", JETP Lett. vol. 29, No. 1, Jan. 5, 1979, pp. 30-33.

G. Pusch, "Why is acetone used in sonofusion experiments?", website http://www.physics-talk.com, Apr. 26, 2004, in 12 pages.

S. Putterman, "Sonoluminescence: Sound into Light", Scientific American, Feb. 1995, pp. 45-51.

R. Raman et al., "Compact Toroid Fueling for ITER", Fusion Engineering and Design 39-40 (1998), pp. 977-985.

R. Raman et al., "Experimental Demonstration of Nondisruptive, Central Fueling of a Tokamak by Compact Toroid Injection", Phys. Rev. Lett., 1994, pp. 3101-3105.

R. Raman et al., "Experimental Demonstration of Tokamak Fueling by Compact Toroid Injection", Nuclear Fusion, vol. 37, 1997, pp. 967-972.

R. Raman et al., "ITER Task D315 (1997): Conceptual Design Definition of a Compact Toroid Injection System", CFFTP G-9729, Sep. 1997, in 24 pages.

Roger Raman et al., "Design of the Compact Toroid Fueler Tokamak de Varennes", Fusion Technology, A Journal of the Nuclear Society, vol. 24, No. 3, Nov. 1993, pp. 239-250.

Richardson et al., "Status of Progress Towards Acoustic Magnetized Target Fusion at General Fusion", 34th Annual Conference on the Canadian Nuclear Society, Jun. 12, 2013, in 15 pages.

I. Sample, "Science runs into trouble with bubbles", The Guardian, Mar. 11, 2004, in 6 pages.

M.J. Schaffer, "Slow Liner Fusion", General Atomics Report GA-A22689, Aug. 1997, in 6 pages.

N. M. Schnurr et. al., "An Analytical Investigation of the Impingement of Jets on Curved Deflectors", AIAA Journal, vol. 10, No. 11, Nov. 1972, in 41 pages.

Ch. Sief, "Sun in a Bottle", Chapter 10, pp. 220-227, Penguin Books Ltd., London, UK (2008).

R. Siemon, et al., "The Relevance of Magnetized Target Fusion (MTF) to practical energy production", A white paper for consideration by the fusion community and the Fusion Energy Scientific Advisory Committee, Jun. 3, 1999, vol. Draft 2, in 24 pages.

R.E. Siemon, et al., "Why Magnetized Target Fusion Offers a Low-Cost Development Path for Fusion Energy", Dec. 1997, in 49 pages.

J.T.Slough et al., "Multimegawatt solid state rf driver for generating rotating magnetic fields", Review of Scientific Instruments, vol. 71, No. 8, Aug. 2000, pp. 3210-3213.

V. Suponitsky et al., "An Overview of Computational Results at General Fusion Inc. with Focus on Hydrodynamics", Proceedings of CFD Society of Canada Conference, May 2012, in 9 pages.

V. Suponitsky et al., "On the Collapse of a Gas Cavity by an Imploding Molten Lead Shell and Richtmyer-Meshkov Instability", Proceedings of the 20th Annual Conference of the CFD Society of Canada, Canmore, Alberta, Canada, May 9-12, 2012, in 8 pages.

V. Suponitsky et al., "Richtmyer-Meshkov instability of a liquid-gas interface driven by a cylindrical imploding wave", Computers & Fluids, vol. 89, Jan. 20, 2014, in 19 pages.

(56) References Cited

OTHER PUBLICATIONS

K. Suslick, "Chemistry cast doubt on bubble fusion", Nuclear News, Sep. 2002, in 2 pages.

A. Takahashi, "Comments on work on sonofusion of D in acetone", http://www.cf.ale.iwateu.ac.jp/jcf/mlist00042.html, Mar. 3, 2002.

Hitoshi Takeuchi et al., "Equations of State of Matter from Shock Wave Experiments", Journal of Geophysical Research, vol. 71. No. 16, Aug. 15, 1966, pp. 3985-3994.

Taleyarkhan et al., "Evidence for Nuclear Emissions During Acoustic Cavitation", Science, Mar. 8, 2002, vol. 295, pp. 1868-1873.

Y.C.F. Thio et al., "Magnetized Target Fusion Driven by Plasma Liners", 2002, in 3 pages.

Y. C. F. Thio et al., "Magnetized Target Fusion in a Spheroidal Geometry With Standoff Drivers," Fusion Technology 20, 1991, in 22 pages.

Y. C. F. Thio et al. "Pulsed Electromagnetic Acceleration of Plasmas," 38th AIAA/ASME/SAE/ASEE Joint Propulsion Conference & Exhibit, Jul. 7-10, 2002, in 9 pages.

M.T. Tobin et al, "The Compact Torus Accelerator, a Driver for ICF", UCRL-93901-R1, Lawrence Livermore Livermore National Laboratory, Jul. 31, 1986, in 9 pages.

D.M.Willett et al., "The internal magnetic structure and current drive in the SPHEX spheromak", Plasma Phys. Control. Fusion, vol. 41, Mar. 1999, pp. 595-612.

J. Wilson, "Hot Sounds", http://www.popularmechanic.com/science/research/12816666.html, Feb. 1, 1998.

F. D. Witherspoon et al., "A contoured gap coaxial plasma gun with injected plasma armature," American Institute of Physics, Review of Scientific Instruments 80, 083506, Aug. 2009, in 15 pages.

F. D. Witherspoon et al., "Pulsed Injector Development for Dense Plasma Jets," Research Funded by the DOE Office of Fusion Energy Science through Grants DE-FG02-04ER83978, DE-FG02-05ER54810, DE-FG02-05ER84189, Feb. 2007, in 32 pages.

G.A. Wurden et al., "FRC Plasma Studies on the FRX-L Plasma Injector for MTF", Paper IC/P6-53, 50th IAEA Fusion Energy Conference, Nov. 2004, in 7 pages.

G.A. Wurden et al., "High Pressure Field Reversed Configuration Plasmas in FRX-L for Magnetized Target Fusion", Jan. 26, 2006, in 2 pages.

G.A. Wurden et al., "Magnetized Target Fusion: A Burning FRC Plasma in an Imploded Metal Can", J. Plasma Fusion Res. Series, vol. 2, Aug. 1999, pp. 238-241.

G.A. Wurden et al., "Progress on the FRX-L FRC Plasma Injector at LANL for Magnetized Target Fusion", Mar. 1, 2002, pp. 1-6.

G.A. Wurden, Letter to Dr. Laberge, May 2007, in 1 page.

C. Xiao et al., "Improved Confinement Induced by Tangential Injection of Compact Torus Into the Saskatchewan Torus-Modified (STOR-M) Tokamak", Phys. Plasmas, vol. 11, No. 8, Aug. 2004, pp. 4041-4049.

International Search Report and Written Opinion for International Application No. PCT/IB2010/000368, dated Jun. 23, 2009.

Extended European Search Report in corresponding European Application No. 10738264.0, dated May 31, 2013, in 8 pages.

Partial Translation of Office Action received in corresponding Japanese Application No. 2011-548807, dated Apr. 10, 2012, in 5 pages.

Compact Toroid, Wikipedia, Http://en.wikipedia.org/wiki/Compact_toroid, downloaded Mar. 14, 2014.

Argomedo, F. B., et al., "Model-based Control of the Magnetic Flux Profile in a Tokamak Plasma," in 49th IEEE Conference on Decision and Control, Dec. 2010, in 6 pages.

Moreau, D., "Plasma Shape, Profiles and Flux Control for High-Bootstrap Steady State Tokamaks," European Fusion Development Agreement, IEA W59 Shape and Aspect Ratio Optimization for High Beta, Steady-State Tokamaks, San Diego, Feb. 2005, in 30 pages.

Witrant, E., et al., "A Simplified Plasma Current Profile Model for Tokamak Control," Jan. 2007, in 7 pages.

SYSTEMS AND METHODS FOR COMPRESSING PLASMA

CROSS-REFERENCE TO RELATED APPLICATIONS

This application is a division of U.S. patent application Ser. No. 15/200,919, filed Jul. 1, 2016, entitled "SYSTEMS AND METHODS FOR COMPRESSING PLASMA," which is a division of U.S. patent application Ser. No. 13/935,281, filed Jul. 3, 2013, entitled "SYSTEMS AND METHODS FOR COMPRESSING PLASMA," now U.S. Pat. No. 9,424,955, which is a continuation of U.S. patent application Ser. No. 12/699,725, filed Feb. 3, 2010, entitled "SYSTEMS AND METHODS FOR COMPRESSING PLASMA," now U.S. Pat. No. 8,537,958, which claims the benefit under 35 U.S.C. § 119(e) of U.S. Provisional Patent Application No. 61/149,886, filed Feb. 4, 2009, entitled "SYSTEMS AND METHODS FOR ACCELERATING AND COMPRESSING A PLASMA;" each of the foregoing is hereby incorporated by reference herein in its entirety.

BACKGROUND

Field

The present disclosure relates to embodiments of systems and methods for compressing plasma. In certain such embodiments, a plasma toroid is compressed using a liquid metal funnel.

Description of the Related Art

Various systems for heating and compressing plasmas to high temperatures and densities have been described. One approach for accomplishing plasma heating and compression by spherical focusing of a large amplitude acoustic pressure wave in a liquid medium is described in U.S. Patent Publication No. 2006/0198486, published Sep. 7, 2006, entitled "Pressure Wave Generator and Controller for Generating a Pressure Wave in a Fusion Reactor", which is hereby incorporated by reference herein in its entirety. In certain embodiments of this approach, a plurality of pistons is arranged around a substantially spherical vessel containing a liquid medium. A vortex or cavity is created in the liquid medium. The pistons are accelerated and strike the outer wall of the vessel generating an acoustic wave. The acoustic wave generated in the liquid medium converges and envelopes a plasma that is introduced into the vortex, thereby heating and compressing the plasma.

A pressure wave generator of the type described in U.S. Patent Publication No. 2006/0198486 can be employed in a Magnetized Target Fusion (MTF) reactor as described, for example, in U.S. Patent Publication No. 2006/0198483, published Sep. 7, 2006, entitled "Magnetized Plasma Fusion Reactor," which is hereby incorporated by reference herein in its entirety. In certain such implementations, a magnetized plasma is introduced into a vortex that is created in the liquid medium, such as molten lead-lithium (PbLi). The acoustic wave produced by the impact of pistons surrounding the spherical reactor vessel can compress the magnetized plasma to high density and temperature.

In some embodiments of the above-described devices, compressed gas such as steam or air can be used to accelerate the pistons. Typically the desired piston impact velocity for plasma compression is of the order of 100 m/s, and so generally a compressed gas pressure of about 1,300 psi is used to accelerate the pistons. To achieve the symmetry of implosion that may be useful or desirable in some implementations, the timing of the piston firing, trajectory, and impact is precisely controlled for each piston. For example, for some plasma compression implementations, all the pistons preferably strike the vessel wall within about 1 µs of each other. In some such implementations, a servo control system can be used to measure precisely the position of each piston and control its trajectory to attain the requisite impact time.

Whilst certain embodiments of such mechanical compression systems are attractive from, for example, a cost perspective, certain such implementations may need frequent maintenance, especially in applications where the repetition frequency of piston firing is high.

SUMMARY

Embodiments of systems and methods for compressing plasma are disclosed. Some embodiments comprise electrically accelerating a plasma, for example, by using a plasma accelerator such as, e.g., a rail gun. The plasma can be accelerated into a funnel of liquid metal where the plasma is further compressed. The use of the liquid metal allows high plasma densities to be achieved, because, in some embodiments, the pressure attained can be higher than the breakpoint or yield strength of solid materials typically used in the apparatus itself.

In certain embodiments, a low density and temperature spheromak or toroidal plasma is formed using a plasma gun, for example, a magnetized coaxial gun. The toroidal plasma is electrically accelerated, compressed and heated to a high density and temperature using a plasma accelerator (e.g., a tapered rail gun) that extends towards a liquid metal funnel. The liquid metal funnel in some implementations can be formed of molten metal such as, for example, molten lead-lithium (PbLi). In various embodiments, the toroidal plasma can be formed as a field-reversed configuration (FRC) or other compact toroid.

In some implementations, the plasma can include a fusionable material such as, for example, isotopes of light elements (e.g., deuterium, tritium, helium-3, lithium-6, and/or lithium-7). The higher plasma densities and/or temperatures that are achievable in some such implementations can be sufficient for the initiation of fusion reactions. Some fusion reactions produce neutrons. Therefore, some embodiments of the system can be configured as neutron sources. Some embodiments of the systems and methods may provide sufficient fusion reactions for net energy production to occur (e.g., above breakeven).

An embodiment of an apparatus for compressing plasma is disclosed. The apparatus comprises a plasma gun configured to generate a compact toroid of plasma, a plasma accelerator, and a liquid funnel system. The plasma accelerator has a first end, a second end, and a longitudinal axis between the first end and the second end. The plasma accelerator is configured to receive the compact toroid at the first end and to accelerate the compact toroid along the longitudinal axis toward the second end. The liquid funnel system comprises a liquid funnel having a substantially cylindrical passage substantially aligned with the longitudinal axis of the plasma accelerator. The passage has a first inner diameter at a top end of the passage and a second inner diameter at a bottom end of the passage. The second inner diameter can be less than the first inner diameter in some embodiments. The liquid funnel system is configured to receive the compact toroid from the second end of the plasma accelerator and to compress the compact toroid as the compact toroid moves along the passage from the top end toward the bottom end. The system can be configured such that a pressure of the compact toroid when below the top end is greater than a pressure of the compact toroid when above the top end.

An embodiment of a liquid metal funnel system configured for compressing plasma is disclosed. The liquid metal funnel system comprises a liquid metal funnel having a substantially cylindrical passage having a first inner diameter at a first end of the passage and a second inner diameter at a second end of the passage. The second inner diameter can be less than the first inner diameter. The liquid metal funnel can be oriented such that the first end of the passage is higher than the second end of the passage. The liquid metal funnel can be configured to receive a plasma from a plasma injector and to compress the plasma as the plasma moves along the passage from the first end toward the second end.

An embodiment of a method of compressing a plasma is disclosed. The method comprises generating a toroidal plasma, accelerating the toroidal plasma along a longitudinal direction, and introducing the accelerated toroidal plasma into a passage in a liquid funnel. The passage can have a first size at a first end of the passage and a second size at a second end of the passage. The second size can be smaller than the first size. The method can also include compressing the toroidal plasma as the toroidal plasma moves from the first end of the passage toward the second end of the passage.

DETAILED DESCRIPTION OF EMBODIMENTS

Figure 1A:
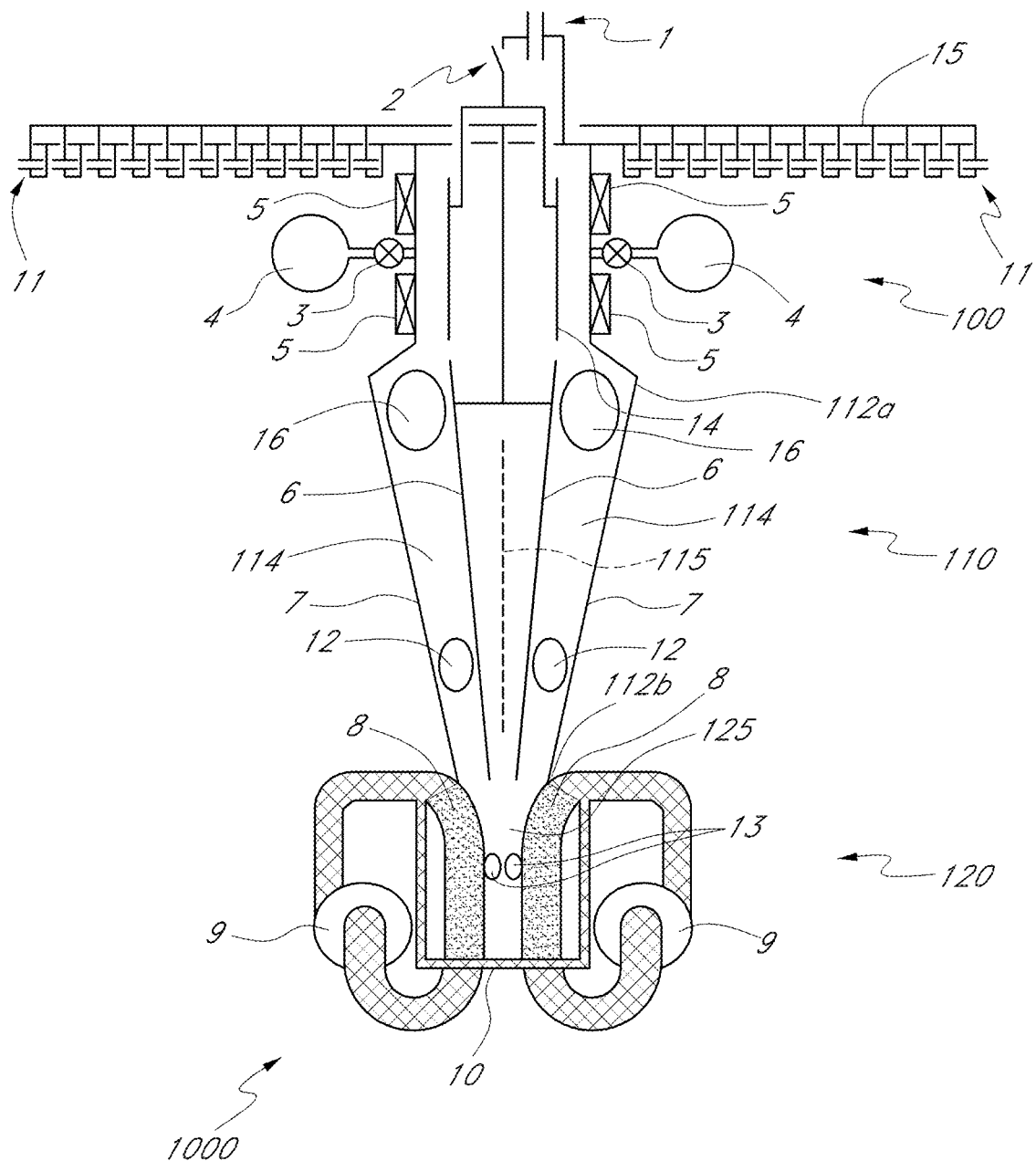
FIG. 1A is a schematic cross-sectional diagram showing an embodiment of a system compressing a plasma in a tapered liquid metal funnel. In this embodiment, a plasma gun forms a compact toroid that is accelerated by a plasma accelerator toward the liquid metal funnel.

Tapered coaxial plasma spheromak accelerators have been built and studied in the past for, e.g., x-ray production, tokomak fuelling, and plasma physics research. However, the maximum achievable magnetic pressure has been limited by the strength of the solid materials used in the apparatus (e.g., a fracture limit, yield strength, or breakpoint of the solid materials). In certain embodiments of the present approach, the magnetic pressure that can be achieved has been increased significantly beyond this limit by using a tapered or funnel-shaped liquid metal tube as described in more detail below.

With reference to the drawings, FIGS. 1A-1D schematically illustrate several embodiments of a system 1000 that can be used to accelerate and compress a plasma. The embodiments shown in FIGS. 1A-1D comprise a plasma gun 100 configured to generate a toroidal plasma (for example, a compact toroid such as, e.g., a spheromak), a plasma accelerator 110 configured to accelerate the plasma along a longitudinal axis 115 of the accelerator 110, and a liquid metal funnel system 120 into which the plasma accelerated by the accelerator 110 is introduced for further compression. In various embodiments, the plasma gun 100 may comprise a magnetized plasma gun that has a gun axis that is substantially aligned or coaxial with the longitudinal axis 115 of the accelerator 110. In some embodiments, the plasma gun 100 comprises a Marshall-type plasma gun. In various embodiments, the plasma accelerator 110 may comprise a rail gun configured to accelerate the plasma using magnetic and/or electromagnetic forces. In some embodiments, the plasma accelerator 110 can provide some degree of plasma compression as the plasma is accelerated along the longitudinal axis 115. For example, the rail gun can comprise one or more tapered electrodes to compress the plasma during acceleration along the longitudinal axis 115. The liquid metal funnel system 120 may comprise a liquid metal funnel, cylinder, or tube 8 having a passage substantially aligned with the longitudinal axis 115 of the accelerator 110. In some embodiments, a cross-section and/or inner diameter of the passage can change from an upper end of the funnel to a lower end of the funnel, e.g., the cross-section (and/or inner diameter) can decrease to allow the plasma to be compressed as the plasma moves below the upper end and toward the lower end. In certain embodiments, the plasma gun 100 and/or the plasma accelerator 110 are positioned substantially above the liquid funnel system 120. In certain embodiments, the upper end of the funnel 8 is substantially above the lower end of the funnel 8.

The toroidal plasma generated by the plasma gun 100 can be a compact toroid such as, e.g., a spheromak, which is a toroidal plasma confined by its own magnetic field produced by current flowing in the conductive plasma. In other embodiments, the compact toroid can be a field-reversed configuration (FRC) of plasma, which may have substantially closed magnetic field lines with little or no central penetration of the field lines.

As schematically illustrated in the embodiments shown in FIGS. 1A-1D, gas from one or more tanks 4 is introduced into the gun by fast puff valves 3. In some implementations, the initial gas pressure is about 15 pounds per square inch (psi) (e.g., about $1.03\times10^5$ Pa). The gas may comprise a fusionable material. For example, the fusionable material may comprise one or more isotopes of light elements such as, e.g., isotopes of hydrogen (e.g., deuterium and/or tritium), isotopes of helium (e.g., helium-3), and/or isotopes of lithium (e.g., lithium-6 and/or lithium-7). Other fusionable materials can be used. Combinations of elements and isotopes can be used. For example, in some implementations, a 50% deuterium-50% tritium gas mixture is introduced from the tank 4 using about 100 puff valves 3. Each pulse from the valves introduces about 2 mg of gas, in one implementation. In other embodiments, a different number of valves can be used and/or a different mass of gas can be introduced. In other implementations, the percentages of deuterium and tritium, respectively, can be different from 50%-50%.

Coils 5 induce a magnetic field in the space between an outer electrode 7 and a formation electrode 14. The coils 5 can be configured to provide a mostly radial stuffing magnetic field of about 0.8 Tesla in some implementations. In the embodiment schematically illustrated in FIGS. 1A-1C, the formation electrode 14 is substantially cylindrical, and the outer electrode 7 is tapered inward toward the liquid metal funnel system 120. In the embodiments schematically illustrated in FIGS. 1B-1D, the magnetic field is produced by 3 magnetic coils 5a, 5b, and 5c, although fewer or greater numbers of coils may be used in other embodiments. In some embodiments, the coil 5a comprises about 140 turns of hollow square 6 mm×6 mm copper wire. During operation of the system, the wire can carry a current of about 1000 Amps at a voltage of about 630 V dissipating about 630 kW. Coil 5b comprises about 224 turns of hollow square 6 mm×6 mm copper wire carrying a current of about 1000 Amps at a voltage of about 832 V dissipating about 830 kW. Coil 5c comprises about 552 turns of hollow square 6 mm×6 mm copper wire carrying a current of about 1000 Amps at a voltage of about 844 V dissipating about 840 kW. In some embodiments, the coils 5a, 5b, and 5c will run substantially continuously during operation of the system. In some embodiments, a cooling system (not shown) provides water (or another coolant), which flows in the hollow wires to cool them.

In certain implementations of the system, it is desirable to introduce gas only between the outer electrode 7 and the formation electrode 14. In certain such implementations, the valves 3 open and close sufficiently rapidly to introduce the gas so that it is substantially confined between the electrodes 7 and 14. For example, at room temperature (e.g., about 20 C), the thermal velocity of the gas is about 900 m/s. If, for example, the distance between the electrodes 7 and 14 is about one meter, the gas could be injected for a duration of less than about 1 ms to provide gas for the generation of each compact toroid. In some implementations, Parker Series 99 valves can be used (available from Parker Hannifin, Cleveland, Ohio).

In some embodiments, the formation electrode 14 is electrically connected to a capacitor bank 1. In some such embodiments, the capacitor bank 1 can comprise a capacitance of about 4.1 mF and the bank can be charged at a voltage of about 22 kV. In some cases, the capacitor bank 1 comprises about eighty 52 μF individual capacitors (e.g., General Atomics Energy Products (San Diego, Calif.), model 33677 capacitors). The individual capacitors can be connected in parallel. The capacitor bank 1 can be connected to the formation electrode 14 using a transmission line. In some embodiments, the total inductance of the transmission line and capacitors is about 20 nF, which advantageously provides a sufficiently fast electric discharge.

During operation of the system 1000, when the gas introduced by the puff valves 3 achieves a suitable pressure between the electrodes 7 and 14, the capacitor bank 1 discharges in the gas, turning the gas into a plasma. The discharge can occur when the capacitor bank voltage exceeds the breakdown voltage of the gas (which can depend on the gas pressure). In some implementations, the bank 1 discharges when the gas pressure is about 10 mTorr (e.g., about 1.3 Pa). The discharge can occur at other gas pressures in other embodiments. In the embodiment shown in FIG. 1A, a switch 2 is activated to discharge the capacitor bank 1 through the gas, generating a plasma. A possible advantage of embodiments using the switch 2 is that the switch can be activated so that the discharge occurs when the gas is at a desired pressure, which may allow increased flexibility during operation.

Figure 1B:
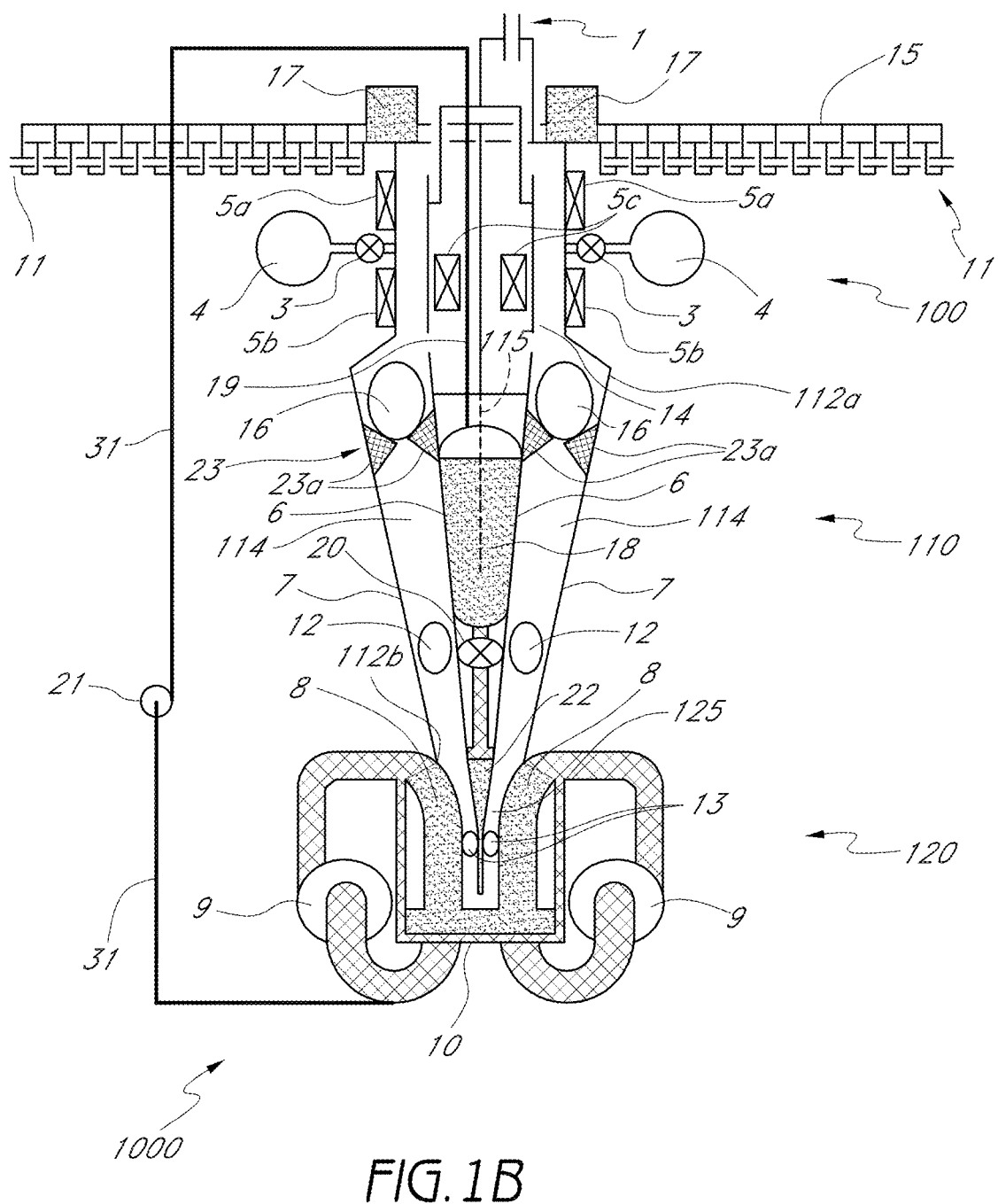
FIG. 1B is a schematic cross-sectional diagram showing another embodiment of a system for compressing a plasma in a liquid metal funnel system. In this embodiment, the funnel system comprises a liquid metal funnel and an axial liquid metal guide disposed substantially along a central axis of the funnel. In this embodiment, the plasma accelerator comprises a plasma restrictor that comprises a constriction in a propagation channel of the accelerator.
Figure 1C:
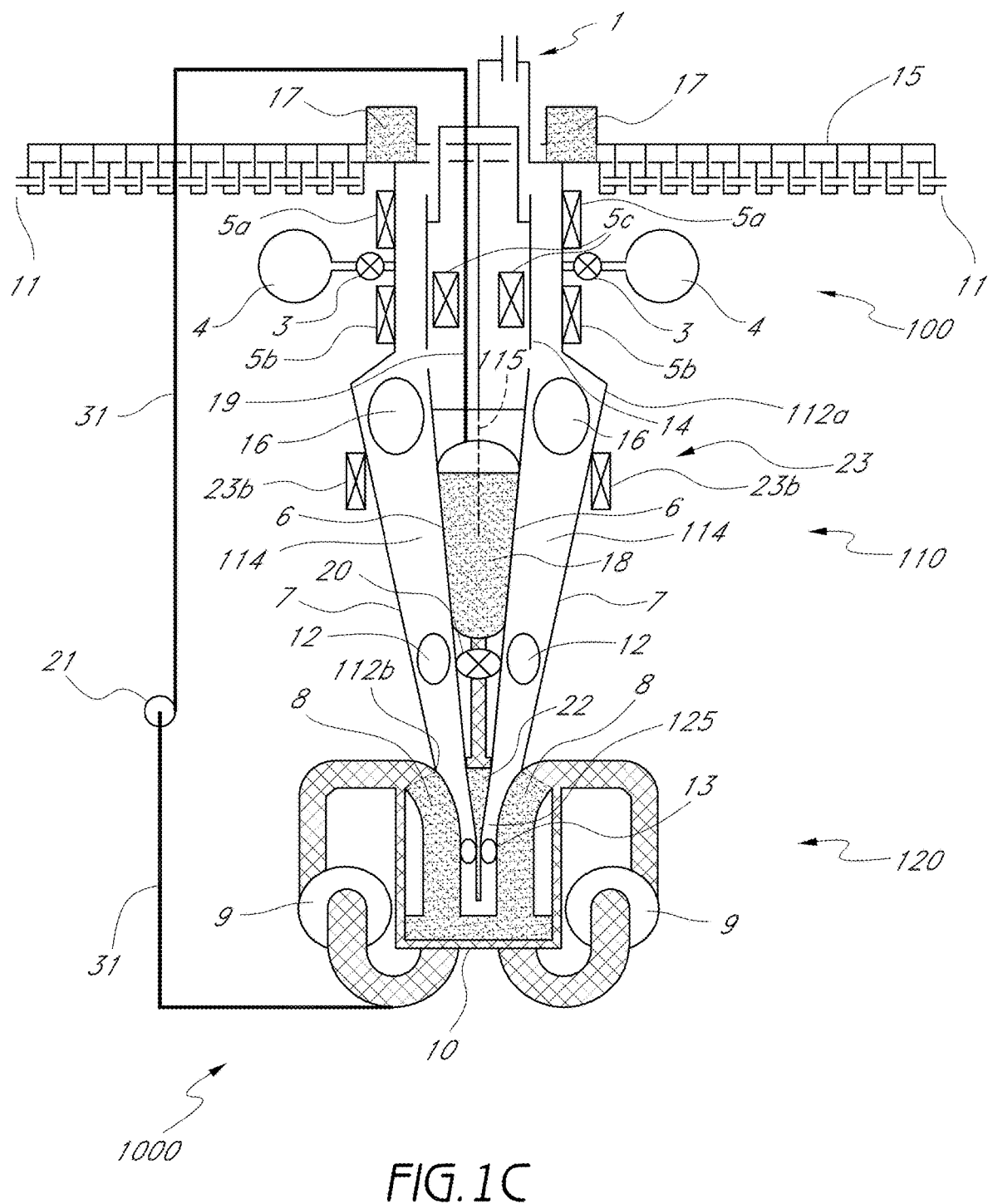
FIG. 1C is a schematic cross-sectional diagram showing another embodiment of a system for compressing a plasma in a liquid metal funnel system. In this embodiment, the plasma accelerator comprises a plasma restrictor that comprises one or more magnetic coils.
Figure 1D:
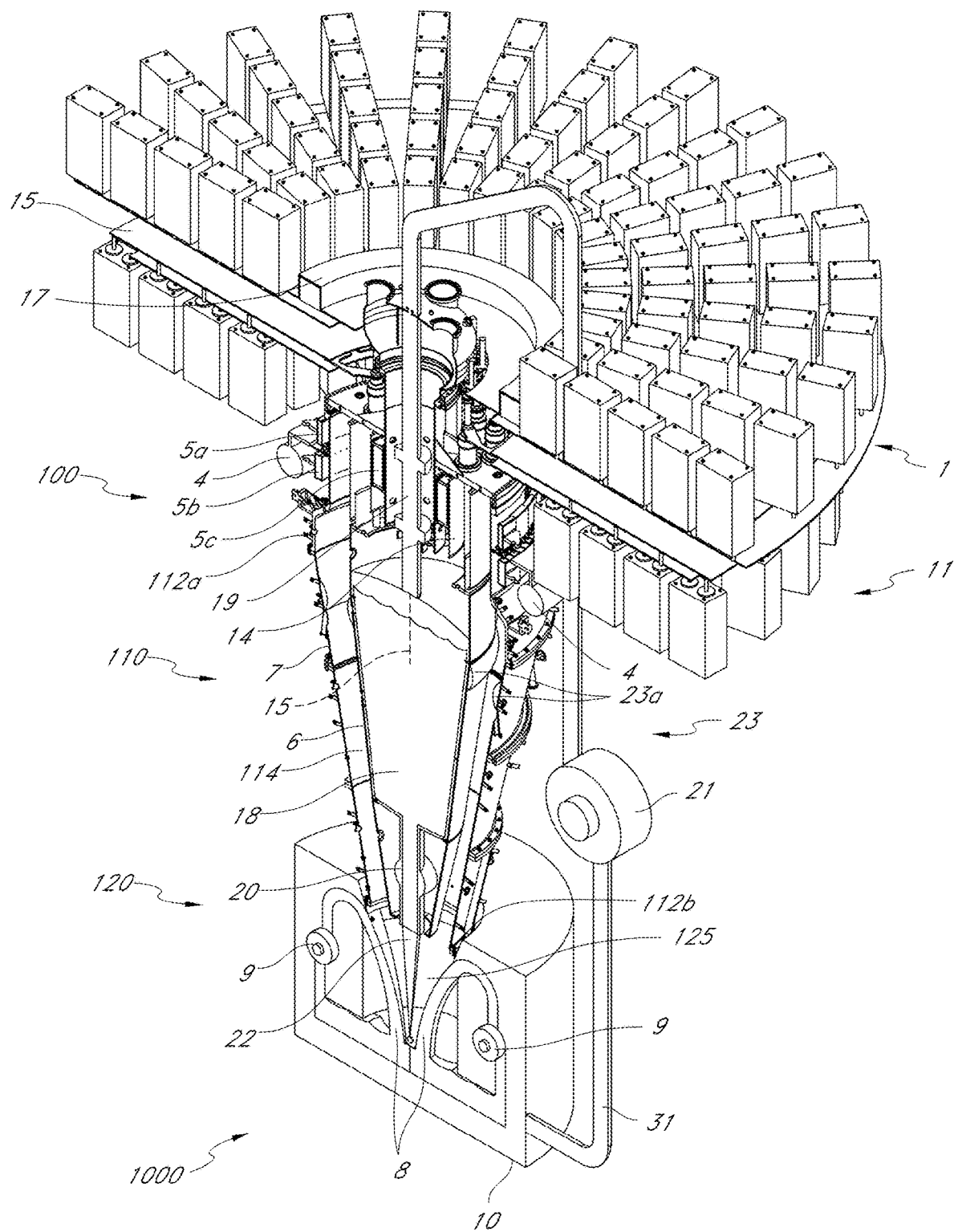
FIG. 1D is a perspective cutaway view of an embodiment of a system for compressing a plasma. The embodiment shown in FIG. 1C is generally similar to the embodiment schematically shown in FIG. 1B.

The current rises (e.g., to about 3 MAmp in about 20 μs in some cases), and the magnetic field from this current forces the plasma in the downward direction in FIGS. 1A-1C, toward the plasma accelerator 110. The stuffing magnetic flux from the coils 5 wraps itself around the plasma. The magnetic field reconnects to form closed magnetic surfaces, and the plasma forms a compact toroid. For example, the toroid may be a spheromak 16 having a relatively low density (e.g., about $10^{15}$ cm$^{-3}$, in some cases) and temperature (e.g., about 20 eV, in some cases).

In some implementations of the system 1000, after a relatively small delay (e.g., about 30 μs, in some cases) to allow the magnetic fields to reconnect and/or to allow turbulence, if present, to settle, the spheromak 16 is accelerated and compressed by the plasma accelerator 110 toward the liquid metal funnel system 120.

For example, in the embodiments schematically illustrated in FIGS. 1A-1D, acceleration electrodes 6 are connected to a second capacitor bank 11, which is used to provide energy to the plasma. In some embodiments, the capacitor bank 11 has a capacitance of about 2.6 mF and is charged at a voltage of about 88 kV. In some such embodiments, the capacitor bank 11 comprises about 100 pairs of 52 μF, 44 kV individual capacitors with each pair electrically connected in series, and the 100 pairs electrically connected in parallel. In some embodiments, the capacitors comprise General Atomics Energy Products (San Diego, Calif.), model 32283 capacitors. In some implementations, the capacitor bank 11 is electrically connected to the acceleration electrode 6 using a substantially disk-shaped transmission line 15 substantially surrounding the coaxial gun 100 to reduce or minimize inductance. The current rise-time of some embodiments is about 40 μs because of the relatively large capacitance of the bank 11. In some embodiments, a substantially disk-shaped transmission line can be used to electrically connect the capacitor bank 1 to the formation electrode 14. In some embodiments, two substantially disk-shaped transmission lines are used: a first substantially disk-shaped transmission line electrically connecting the capacitor bank 1 to the formation electrode, and a second substantially disk-shaped transmission line electrically connecting the capacitor bank 11 to the acceleration electrode 6.

The plasma accelerator 110 comprises a plasma propagation channel 114 through or along which the toroidal plasma 16 is accelerated. For example, as schematically illustrated in FIGS. 1A-1D, the acceleration electrode 6 can be disposed within the outer electrode 7, and the plasma propagation channel 114 comprises space between the electrodes 6 and 7. The plasma propagation channel 114 can have a cross-section (perpendicular to the longitudinal axis 115) that changes (in shape, size, width, spacing, and/or any other way) from a first end 112a to a second end 112b of the accelerator. For example, in the embodiments illustrated in FIGS. 1A-1D, at least one of the electrodes 6 and 7 can be tapered from the first end 112a of the accelerator 100 (e.g., near the plasma gun 100) to the second end 112b of the accelerator 100 (e.g., near the funnel system 120). For example, in some embodiments, the radius of the accelerator 110 (e.g., a radius from the longitudinal axis 115 to the center of the channel 114) decreases by a factor of about 30 from the first end 112a to the second end 112b. In other embodiments, the radius of the accelerator 110 decreases from the first end to the second end by a factor of about 2, about 5, about 10, about 20, about 50, about 100, or some other factor. In various embodiments, the radius decrease of the accelerator from the first end to the second end can be in a range from about 10 to about 50, in a range from about 20 to about 40, or some other range.

With further reference to the embodiments schematically illustrated in FIGS. 1A-1D, the magnetic force of the plasma accelerator 110 accelerates the toroidal plasma 16 between the tapered coaxial electrodes 6 and 7 and heats and compresses the plasma to higher temperature and density, forming a compressed toroidal plasma 12.

The configuration of the electrodes 6, 7 can be selected to provide a desired amount of compression as the plasma moves from the first end 112a to the second end 112b of the accelerator 110. For example, one or more factors including the tapering, shape, and/or spacing of the electrodes 6, 7 can be selected to provide a desired compression. In the case of some toroidal configurations of plasma (e.g., compact toroids), the compression of the plasma in some implementations of the system 1000 can be measured in terms of a radial compression of the toroid (e.g., a ratio of the radius of the toroid when in a first position in the system to the radius of the toroid when in a second position in the system). For example, in some embodiments, the radial compression of the plasma as the plasma moves from the first end 112a to the second end 112b of the accelerator 110 is about 30:1. The radial compression of the plasma in the accelerator 110 can be different in other embodiments such as, for example, about 2:1, about 5:1, about 10:1, about 15:1, about 20:1, about 30:1, about 50:1, about 100:1, etc. In various embodiments, the compression of the plasma in the accelerator 110 can be in a range from about 10:1 to about 50:1, in a range from about 20:1 to about 40:1, or in some other appropriate range. In some embodiments, tapering of the electrodes 6, 7 is not used in the accelerator 110, and there is substantially no compression of the plasma in the accelerator 110.

In other embodiments, the plasma accelerator 110 may be configured so that the outer electrode 7 acts as the acceleration electrode. In other embodiments, both electrodes 6 and 7 can be used to electromagnetically accelerate the plasma from the first end to the second end. In other embodiments, additional electrodes can be used (e.g., to assist stabilizing the plasma and/or to inhibit tilting of the toroid in the channel 114).

The electrodes 6, 7, and/or 14 can be formed from electrically conductive metal. The electrodes 6, 7, and/or 14 can be formed in one or more sections. For example, in some embodiments, the electrodes 6, 7, and/or 14 comprise one or more stainless steel 304 plates or sheets having a thickness of about 5 mm. The sections of the electrodes can be joined together by welding, fasteners (e.g., bolts), etc. In other embodiments, the electrodes can be formed from additional and/or different materials and/or thicknesses of material. In some implementations, the plasma can become sufficiently hot to at least partially vaporize some of the electrodes. Vaporization of the electrode may in some cases contaminate the plasma with metallic impurities that can cool down the plasma. Therefore, in certain implementations that utilize electrodes that can (at least partially) vaporize, one or more of the electrodes 6, 7, and 14 can be coated with a high melting point material such as, e.g., tungsten. The coating material can be selected so that the melting point of the coating material (e.g., tungsten) is greater than the melting point of the electrode material (e.g., stainless steel). For example, in some implementations, tungsten is plasma sprayed on the electrode material (e.g., stainless steel 304). For example, Flamespray Northwest in Seattle, Wash., provides plasma spraying services. In other embodiments, the high melting point material can be layered or deposited on the electrode. In other embodiments, the electrodes are formed from the high melting point material.

During the current rise time, the plasma will accelerate as it moves in the plasma propagation channel 114 (e.g., the space between the acceleration electrode 6 and the outer electrode 7) toward the liquid metal funnel system 120. In some implementations, the plasma accelerates for a distance of about 20 m and then for another distance of about 20 m or so to finish discharging the capacitor bank 11. In such embodiments, the total length of the plasma accelerator 110 is about 40 m. Different lengths of the plasma accelerator are possible. For example, the voltage on the capacitors in the bank 11 can be increased while the capacitance of the bank 11 is reduced, thereby maintaining the energy stored in the capacitor bank 11. This can reduce the current rise time and length of the accelerator 110. Use of higher voltage in some implementations may have possible disadvantages such as being technologically challenging and expensive.

In some embodiments, the plasma accelerator 110 comprises a plasma restrictor 23. The length of an embodiment of the accelerator 110 comprising a plasma restrictor can be less than the length of an accelerator embodiment that does not comprise a plasma restrictor. In the embodiment shown in FIG. 1B, the plasma restrictor 23 is disposed near the first end 112a of the accelerator 110, for example, below the first end 112a. As the current to the electrodes 6 and/or 7 increases, the magnetic field of the plasma accelerator 110 is initially insufficient to force the plasma past the restrictor 23. Movement of the plasma along the propagation channel 114 is inhibited. The system can be configured such that as the magnetic field of the accelerator 110 increases (e.g., as the current and/or voltage supplied to the electrodes 6 and/or 7 increases), the magnetic field increases and reaches a threshold value at which the magnetic force is sufficient to force the plasma past the restrictor 23. The plasma then accelerates along the propagation channel 114. For example, the system may be configured such that at (or near) peak current the magnetic force is sufficient to push the plasma through the restrictor 23 and to start the plasma accelerating down the plasma accelerator 110.

In some embodiments, the plasma restrictor 23 comprises a constriction in the plasma propagation channel 114. For example, the constriction may comprise a narrowing of the space between the acceleration electrode 6 and the outer electrode 7. In some embodiments, the constriction is provided by disposing one or more structures 23a in the plasma acceleration channel 114 (see, e.g., FIG. 1B). In other embodiments, the constriction in the plasma channel 114 is provided by shaping the outer electrode 7 and/or the acceleration electrode 6 so that the channel 114 narrows at the location of the constriction. The location, shape, size, spacing, and/or number of constrictions (e.g., structures disposed in or along the channel 114 or narrowings of the channel 114) disposed along the propagation channel 114 can be selected to provide a desired amount of restriction against movement of the plasma along the channel 114. In some such implementations, an accelerator length of about 10 m can be used to transfer the energy from the capacitor bank 11 to the plasma using an 88 kV capacitor voltage.

In other embodiments, the plasma restrictor 23 can be configured differently than the constriction schematically illustrated in FIG. 1B. For example, FIG. 1C schematically illustrates an embodiment in which the plasma restrictor 23 comprises one or more magnetic coils 23b disposed near the first end 112a of the accelerator 110. When a current is supplied to the one or more magnetic coils 23b, the coils 23b provide a restricting magnetic force than inhibits movement of the plasma toroid past the position of the coils until the magnetic force produced by the accelerator 110 is above a threshold. In some embodiments, the current to the coils 23b can be reduced (or switched off) to reduce (or substantially eliminate) the restricting magnetic field in order to permit the plasma toroid to accelerate toward the second end 112b of the accelerator 110. In some embodiments, a combination of the increase in the magnetic force provided by the accelerator 110 and the reduction of the restrictive magnetic force provided by the coils 23b permits the plasma to accelerate along the channel 114 at an appropriate time. In some embodiments, the magnetic field produced by the coils 23b is sufficient to inhibit acceleration of the toroidal plasma along the channel 114, even at maximum current in the accelerator 110. In such embodiments, the current to the coils 23b is reduced (or switched off) to release the toroidal plasma at a desired time. In some embodiments, the plasma restrictor 23 can comprise one or more constrictions 23a and one or more coils 23b After the plasma is formed, the plasma electrically contacts the outer electrode 7 and the acceleration electrode 6. This contact can short circuit the acceleration capacitor bank 11 and start current flowing through the plasma. As discussed above, it may be desirable in some implementations to delay the acceleration (e.g., for about 30 µs, in some cases) to allow the closed magnetic surfaces to form and/or for turbulence, if present, to settle. In some such implementations, a saturable inductor 17 (see, e.g., FIG. 1B) is used to delay the voltages provided to the electrodes. The saturable inductor 17 can be disposed in transmission line 15. The saturable inductor 17 may comprise a saturable magnetic material. For example, an amorphous metal such as, e.g., METGLAS 2605Co (available from Metglas Inc., Conway, S.C.) can be used. To provide a delay of about 30 µs at a voltage of about 88 kV the inductor 17 can store about 88 kV multiplied by 30 µs=2.6 V·s. In some embodiments, the inductor 17 is substantially toroidal with a cross-section of about 0.6 m$^2$ and a major radius of about 1 m. In some embodiments, the inductor 17 comprises Metglas wound tape with a saturation field of about 1.8 Tesla to provide an appropriate delay.

In the embodiments schematically illustrated in FIGS. 1A-1D, the system is configured so that at or before the point where the pressure of the plasma builds so that it could exceed the break point or strength of the material or the assembly comprising the electrodes 6 and/or 7 (or other components of the accelerator near the second end 112b), the plasma exits the accelerator 110 and enters the liquid metal funnel system 120. An advantage of some of these embodiments is that the pressure of the plasma in the accelerator is increased to a relatively large value without damaging the accelerator (e.g., due to yield failure and/or deformation of second end 112b of the accelerator 110).

Figure 5A:
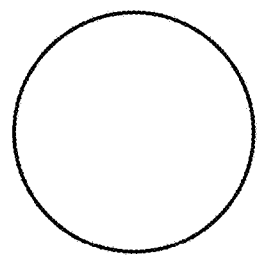
FIGS. 5A-5C show cross-sections of a portion of an inner surface of the passage that is substantially circular, substantially oval, and substantially polygonal, respectively.
Figure 5B:
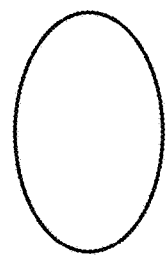
Figure 5C:
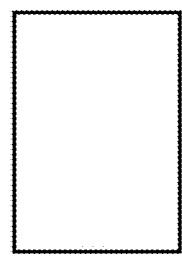

In the illustrated embodiments, the liquid metal funnel system 120 comprises a tank 10 and one or more pumps 9 configured to circulate the liquid metal to form a liquid metal funnel 8. The liquid metal flows from a top end of the funnel system 120 to a bottom end of the funnel system 120 under the influence of gravity. In some embodiments, the top end of the funnel system 120 is substantially above the bottom end of the funnel system 120. In some embodiments, the pumps 9 may provide a pressure to the liquid metal, which may also influence the flow of the liquid metal in the tank 10. In some implementations, the funnel 8 has a substantially cylindrical shape having a passage 125 that is substantially aligned with a longitudinal axis of the plasma accelerator 110. The cross-section of the passage 125 (perpendicular to a longitudinal axis of the passage 125) may be substantially circular, substantially oval, substantially polygonal, or any other shape. The cross-sectional shape (and/or size) of the passage can change from the top end to the bottom end. For example, the cross-sectional area at the bottom end may be less than the cross-sectional area at the top end. The passage 125 may have an inner surface having an inner diameter. The cross-section of the inner surface can be substantially circular, substantially oval, substantially polygonal (e.g., rectangular), or any suitable shape (see FIGS. 5A-5C). The inner diameter at the bottom end can be less than the inner diameter at the top end. The cross-sectional shape, size, and/or the inner diameter of the passage can be configured to provide a desired amount of compression for the plasma as it moves below the top end. For example, in some embodiments, the inner diameter of the passage 125 at the bottom end is about a factor of 3 smaller than the inner diameter of the passage 125 at the top end. The ratio of the inner diameter of the passage at the top end to the inner diameter of the passage at the bottom end can be about 1.5, about 2, about 4, about 5, about 10, about 15, or greater. This ratio can be in a range from about LS to about 5, from about 2 to about 4, or some other range.

In some embodiments, the plasma may move from the top end to the bottom end of the passage. In other embodiments, the plasma pressure may become sufficiently large during movement of the plasma along the channel that the plasma may disrupt the funnel 8 before the plasma reaches the bottom end of the passage.

In certain embodiments, the liquid material comprising the liquid funnel 8 does not substantially rotate around an axis of the passage. In other embodiments, the liquid material can be introduced into the tank 10 so that the liquid material rotates around the axis of the passage as the liquid material moves from the top end to the bottom end. Funnels in which the liquid material possesses some amount of rotation (or swirling) may provide advantages in some implementations such as, e.g., increasing stability of the inner surface of the passage.

Because the plasma can move at a speed (e.g., about several tens of km/s, or higher, in some cases) that is higher than the speed of sound in the liquid metal (e.g., about 3 km/s, in some cases), the liquid metal does not have time to move out of the way as the plasma moves through the liquid funnel system 120 (e.g., the inertia of the liquid metal funnel at least partially confines the plasma). The liquid metal therefore tends to act as if it were a solid to the plasma and can act to confine the plasma in the passage 125 of the funnel 8. The plasma can experience compression (and heating) in the funnel 8 as the plasma moves from the top end of the funnel 8 to the bottom end of the funnel 8. For example, a pressure of the plasma when the plasma is below the top end of the funnel 8 can be greater than a pressure of the plasma when the plasma is above the top end of the funnel 8. FIGS. 1A-1C schematically illustrate the compressed plasma toroid 13 in the funnel 8.

The radial compression of the plasma in the passage 125 of the funnel 8 can be about 3:1 (or greater) in some implementations. In other implementations, the radial compression of the plasma can be about 1.5:1, about 2:1, about 4:1, about 5:1, about 7:1, about 10:1, about 15:1, or greater. The radial compression of the plasma in the passage 125 of the funnel 8 may be in a range from about 1.5:1 to about 5:1, from about 2:1 to about 4:1, or some other range. In certain implementations, a desired total radial compression of the plasma measured between the first end of the accelerator 110 and the final position of the plasma in the funnel 8 (e.g., when the plasma pressure becomes sufficiently large to disrupt the funnel) can be about 200:1, about 150; 1, about 100:1, about 90:1, about 75:1, about 50:1, about 30:1, about 20:1, about 10:1, or some other value. The total radial compression can be in a range from about 50:1 to about 150:1, from about 75:1 to about 125:1, about 80:1 to about 100:1, or some other range.

In some implementations, the desired total radial compression of the plasma toroid (e.g., from the first end 112*a* of the accelerator 110 to the final position of the plasma in the funnel 8) can be achieved by configuring the system 1000 to have a first compression ratio in the accelerator 110 and to have a second compression ratio in the funnel 8 such that the first compression ratio multiplied by the second compression ratio equals the desired total compression ratio. For example, to achieve a total compression of about 90:1, the accelerator 110 can be configured to provide a first compression ratio of about 30:1 and the funnel 8 can be configured to provide a second compression ratio of about 3:1. These ratios are not limitations on the disclosed systems and methods, and continuing with this example, a total compression ratio of 90:1 can be achieved differently in different implementations of the system 1000, e.g., about 45:1 in the accelerator and about 2:1 in the funnel, about 18:1 in the accelerator and about 5:1 in the funnel, and so forth. In some embodiments, the first compression ratio in the accelerator 110 is selected so that a pressure of the plasma at the second end 112*b* of the accelerator is at or below the material strength or breakpoint of the materials or assemblies of materials at the second end 112*b* of the accelerator 110. In some implementations, the accelerator 110 can be configured to provide a desired first compression ratio more readily than the liquid funnel can be configured to provide a desired second compression ratio. In some such implementations, it may be advantageous for the accelerator 110 to provide more compression than the funnel 8 (e.g., the first compression ratio is larger than the second compression ratio).

The liquid funnel 8 can comprise a suitable liquid metal such as, for example, molten lead-lithium (PbLi) with about 17% lithium (Li). Other lithium percentages can be used in other embodiments (e.g., 0%, 5%, 10%, 15%, 20%, 25%, etc.). Also, other liquid materials (e.g., other liquid metals, liquid metal alloys, etc.) can be used in other embodiments. For example, in other embodiments, substantially pure liquid lithium and/or enriched liquid lithium can be used. In some embodiments, the liquid metal comprises one or more lithium isotopes, which can absorb neutrons and produce tritium.

In some implementations of a system in which the plasma comprises a fusionable material, the plasma can be compressed to a density and/or temperature sufficient to initiate at least some thermonuclear reactions in the fusionable material. The thermonuclear reactions may produce neutrons. Some of the neutrons may be used for neutron analysis if the system is configured, e.g., as a neutron source. Some of the neutrons may be absorbed by, e.g., the liquid metal funnel 8 and their energy converted to heat in the molten funnel. Some of this heat may be extracted to produce electrical power (e.g., via steam turbines) if the system is configured, e.g., as an energy source. During or after passage of the plasma through the funnel 8, the liquid metal funnel 8 generally is at least partially disturbed and/or destroyed (e.g., the liquid metal splashes outwards but is contained by a tank 10). The pumps 9 circulate liquid metal into the tank 10 to re-form the liquid metal funnel 8 for subsequent injections (or shots) of the plasma. Accordingly, embodiments of the system schematically illustrated in FIGS. 1A-1D may be configured to act as a pulsed source of neutrons and/or energy as plasma toroids are repeatedly introduced into the liquid metal funnel 8.

In some embodiments (see, e.g., FIGS. 1B-1D), in addition to the liquid metal funnel 8, the liquid funnel system 120 comprises a substantially central or axial liquid guide 22. For example, the liquid guide 22 can be substantially aligned with the longitudinal axis 115 of the accelerator 110 and/or the axis of the passage 125. The liquid guide 22 can be configured to stabilize and/or reduce a tendency for tilting of the plasma torus in the funnel system 120. In some embodiments, the liquid guide 22 is supplied by liquid metal from a liquid metal storage tank or reservoir 18. The storage tank 18 is disposed between the acceleration electrodes 6 in some embodiments. In the embodiment shown in FIG. 1B, the liquid guide 22 flows at least partially under gravity toward the bottom of the tank 10, and a pump 21 can be used to recirculate the liquid metal back into the storage tank 18 for reuse.

In some such embodiments, it is advantageous if the liquid metal used for the funnel 8 and the liquid metal used for the liquid guide 22 comprise the same material, because of the likely mixing of the liquid metal of the guide 22 and the liquid metal of the funnel 8 in the tank 10. For example, the liquid metal for the liquid guide 22 can comprise molten PbLi.

In some such embodiments, the plasma is compressed between the inner surface of the funnel 8 and the outer surface of the liquid guide 22, which advantageously may provide a larger amount of compression than embodiments not using a liquid guide 22. The size and/or shape of the funnel 8 and/or the liquid guide 22 can be configured to provide a desired amount of compression and/or heating for the plasma as the plasma moves below the top of the liquid metal funnel system 120. The liquid guide 22 may be physically and/or electrically isolated from the liquid funnel 8 (and/or the tank 10) in various embodiments.

An advantage of some embodiments of the system that use a liquid guide 22 is that the liquid metal is electrically conductive and acts like a substantially central or axial electrode. In some such embodiments, the electrical current from the plasma accelerator 110 can continue to provide a magnetic (and/or electromagnetic) force that pushes on the plasma to provide further compression. Accordingly, some such embodiments can provide additional compression compared to certain embodiments not comprising the liquid guide, in which compression in the funnel 8 is provided primarily by the momentum of the plasma.

In certain embodiments, the liquid guide 22 is electrically isolated from the outer electrode 7, to reduce the likelihood of or avoid shorting the electrical circuit. In certain such embodiments, the liquid guide 22 is not provided continuously into the tank 10. For example, the liquid funnel system 120 may comprise a liquid guide injection system that injects the liquid guide 22 into the passage of the funnel 8 at desired times. For example, the liquid guide injection system can comprise a pulse valve 20 that can be opened shortly before a plasma shot. The plasma shot can be fired before the lower end of the liquid metal in the liquid guide 22 contacts the bottom of the tank 10 (or contacts liquid metal at the bottom of the tank 10), because such contact is likely to complete the electrical circuit. After each shot, the pump 21 (e.g., an intermittent pump) recirculates some of the liquid metal in the tank 10 to the storage tank 18. In some embodiments, the pump 21 operates to refill the storage tank 18 when the acceleration electrode 6 is not at a high voltage (e.g., between shots of plasma). In some embodiments, a portion of the recirculation plumbing (e.g., a return pipe 31) used for recirculating the liquid metal into the tank 18 comprises an electrically insulated section 19 (see, e.g., FIGS. 1B and 1C). The insulator section 19 can be oriented substantially vertically to permit drainage of residual liquid metal after refilling of the storage tank 18 to reduce the likelihood of short circuiting the acceleration electrode 6. In some embodiments, the space above the fluid in the storage tank 18 is pressurized (e.g., at a pressure of about 30 psi, in some cases) (e.g., about $2.07 \times 10^5$ Pa) with an inert gas such as, e.g., argon. The pressurized inert gas provides a downward force on the liquid in the storage tank 18 that (in combination with gravity) allows the liquid metal to be ejected at a desired speed.

Example Magnetized Target Fusion Applications

The following discussion is intended to give illustrative, non-limiting examples of certain parameters of an embodiment of a system that could be used to achieve certain plasma compression values. Various assumptions are discussed in the context of these examples, and various equations and example calculations are provided herein to highlight some of the factors and considerations involved in an example embodiment of a system for compressing a plasma. The following discussion is not intended to limit the scope of the systems and methods described herein, nor end-uses or applications of the disclosed systems. In other implementations of the systems and methods described herein, other equations, parameters, factors, and considerations may be applicable.

Magnetized Target Fusion (MTF) systems typically use significant energy (e.g., about 100 MJ in some cases) to compress the plasma. For generating fusion energy in many systems, the well-known Lawson criteria indicates that a plasma of density n, maintained at a temperature of 10 keV, for a time t, should be selected so that $n\tau > 10^{20}$ m$^{-3}$ s for fusion heating to exceed plasma heat losses. However, the plasma cools down with a time $\tau = r^2/\chi$ where r is the smallest distance between the hot plasma core and the cold edge of the reactor, and $\chi$ is the diffusivity. Therefore, a larger plasma (e.g., larger r) may be beneficial but uses more energy for its formation, and generally therefore a larger and more expensive apparatus.

The energy in the plasma is $3/2\,NkT_i$ for the ions and $3/2N\,kT_e$ for the electrons, where $T_i$ is ion temperature, $T_e$ is electron temperature and N is the number of ions or electrons. The number of ions and electrons is equal in the case of overall charge neutrality. Assuming $T_i$ and $T_e$ are the same temperature, then the thermal energy ($E_{th}$) in the plasma is $3NkT$.

Thus, the following equations are applicable for providing estimates for example parameters in certain embodiments of the system:

$$n\tau > 10^{20}\,\text{m}^{-3}\text{s}$$

$$\tau = r^2/\chi$$

$$E_{th} = 3VnkT$$

with $N = nV$, where V is plasma volume, and $E_{mag} = E_{th}/\beta$ where $\beta$ is the ratio of plasma pressure/magnetic pressure. The total energy is the thermal energy $E_{th}$ plus the magnetic energy $E_{mag}$. For a torus, the volume is $2\pi^2 r^2 R$ where R is the major radius (around the torus) and r is the minor radius. For a compact torus R is approximately equal to r so the volume can be approximated as $2\pi^2 r^3$.

Combining these equations it is found that the minimal energy to reach the Lawson criterion at 10 keV temperature in some system embodiments is about:

$$E = 7 \times 10^{16}(1+1\beta)\chi^{3/2} n^{-1/2} \text{ Joules with } n \text{ in m}^{-3} \text{ and } \chi \text{ in m}^2/\text{s}.$$

The energy E decreases with increasing density and decreases with decreasing $\chi$. Diffusion and the value of $\chi$ in these systems is a subject of much research. The value of diffusion in some systems is much larger than a so-called classical calculation because of complex turbulence. Classical estimates for the value of diffusion generally provide the best possible diffusion. Many experiments observe a diffusion much larger than classical, but less than the so-called Bohm diffusion where:

$$\chi_{Bohm} = \rho_i v_i / 16$$

where $\rho_i$ is the ion gyroradius and $v_i$ is the ion thermal velocity.

Figure 2:
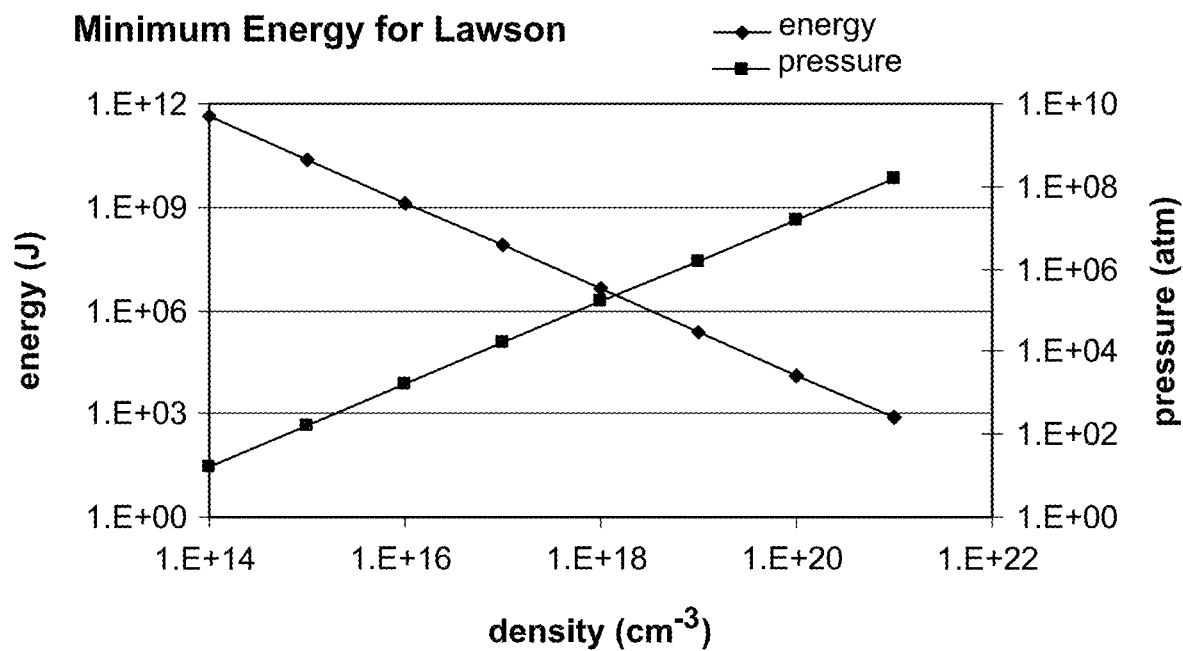
FIG. 2 is a graph indicating an example calculation of the energy of the plasma to achieve the Lawson criteria for various plasma densities and an example calculation of the magnetic pressure of a plasma at various plasma densities. These example calculations are based on Bohm diffusion and certain other assumptions described below. Note that a pressure of 1 atmosphere (atm) is about $10^5$ Pa.

Assuming Bohm diffusion (as a worst case example scenario), the minimal plasma energy to achieve the Lawson criterion for various plasma densities (e.g., at 10 keV and $\beta = 0.1$ typical of certain spheromaks) can be predicted from the above equations for the above example system and is shown in the graph illustrated in FIG. 2 (solid line with diamonds). The magnetic pressure of a plasma at a temperature of 10 keV, $\beta = 0.1$ at various densities is also plotted on the graph shown in FIG. 2 (solid line with squares). The maximum pressure that solid material can take before breaking is typically about $1 \times 10^4$ atm (e.g., about 1000 MPa). At that pressure, the example calculations shown in FIG. 2 indicate the example system should provide about 100 MJ in the plasma to achieve break-even, and possibly a few times more than that energy for a practical gain. Assuming a transfer efficiency from the power source to the plasma of about 50%, the system should provide at least about 200 MJ of energy to heat the plasma to a fusion temperature.

Embodiments of the disclosed system configured as an energy source may provide advantages. For example, using a liquid metal funnel can allow pressures in the plasma to be achieved that are above the breaking point of solid materials. Therefore, embodiments of the disclosed systems may provide increased plasma density, which advantageously reduces the energy used by the system. This may also reduce the cost and/or size of the system.

In some embodiments of the present systems and methods, the plasma pressure increases as the plasma is accelerated and then compressed as the plasma moves down the accelerator 110 (e.g., along the propagation channel 114 between the coaxial tapered electrodes 6, 7). At or before the point along the plasma path where the plasma pressure meets and/or exceeds the strength of the confining electrode material, the plasma is directed into the liquid metal funnel system 120 in which further compression occurs. For example, the plasma compression can be about a factor of 30 in the accelerator and about a factor of 3 in the funnel system. In some embodiments, the plasma can be accelerated to a speed greater than about 100 km/s down the accelerator 110. The speed of sound in the liquid metal is generally of the order 3 km/s, so the liquid metal does not have time to move out of the way, and a high plasma pressure is maintained in the funnel 8. In some implementations, a shock wave wake may be generated in the liquid metal. The energy in the shock wave wake is drawn from the plasma kinetic energy; which can be a new energy loss mechanism in some such embodiments.

Figure 3:
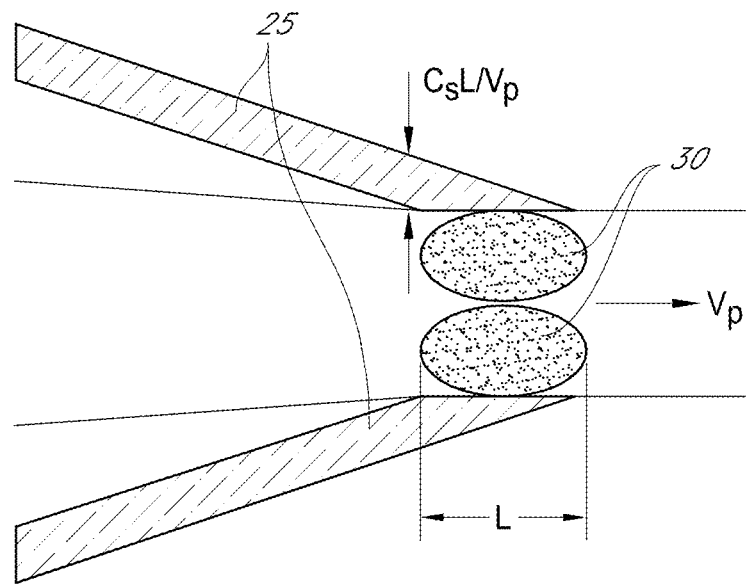
FIG. 3 is a schematic cross-sectional diagram showing an example of a toroidal plasma within a tapered liquid metal funnel.

FIG. 3 is a schematic cross-sectional diagram showing an example of a toroidal plasma 30 moving within a portion of a tapered liquid metal funnel 25. Assuming a plasma speed $v_p$ and plasma length L, and a liquid metal with a sound speed of $c_s$, the schematic diagram in FIG. 3 shows a shock wave trailing behind the plasma. The thickness of the shock wave is about $c_s L/v_p$. In a time of about $L/v_p$ (e.g., the time for the plasma to travel its own length), the volume of the compressed liquid in the funnel is about $2\pi RLc_s \cdot L/v_p$. Dividing the compressed volume by the time gives an estimate for the rate at which liquid metal is compressed:

$$dV/dt = 2\pi RLc_s \text{ m}^3/\text{s}$$

where R is the radius of the liquid metal funnel 25.

As an example, a simple approximate formula for the equation of state for the liquid metal can be used:

$$P = K(V_0/V - 1)$$

where K is the volume compression modulus and $V_0$ is the initial volume at zero compression.

Accordingly, the compression work, PdV, can be integrated to calculate the energy stored in the compressed liquid metal in this example:

$$E/V = K[\ln(P/K+1) - 1/(1+K/P)] \text{ J/m}^3$$

The power dissipated in the wake is given by the following formula in this example:

$$\text{Power} = 2\pi RLc_s K[\ln(P/K+1) - 1/(1+K/P)] \text{ Watts}$$

In some implementation, electrical currents may be induced in the liquid metal by the magnetic field of the spheromak. Resistive losses in the liquid metal may reduce the energy in the magnetic field that contains the plasma, representing another possible energy loss mechanism in some cases. The following illustrative example is used to provide an estimate for this energy loss mechanism.

The current I flowing in the liquid metal to support the magnetic field is:

$$I = LB/\mu_0$$

where L is the length of the plasma, B is the magnetic field in the spheromak (or other suitable compact torus) and $\mu_0$ is the vacuum permeability.

The thickness t of the sheet of electric current flowing in the metal is given by:

$$t = (\eta \tau/\mu_0)^{1/2}$$

where $\eta$ is the electrical resistivity of the metal and $\tau$ is the time during which the magnetic field is applied to the metal and where $\tau = L/v_p$ The resistance is as follows:

$$\text{Resistance} = \eta 2\pi R/Lt$$

Thus, the power dissipated Ohmically in the liquid metal is:

$$\text{Power} = \text{Resistance } I^2 = 2\pi RB^2(\eta L v_p)^{1/2} \mu_0^{-3/2} \text{ Watts}$$

In some implementations, there also may be power losses due to turbulent transport. An estimate for such power losses, using the Bohm diffusion formula, is:

$$\text{Power}_{Bohm} = E_{th}/\tau_{Bohm}$$

Bremsstralung radiation losses may occur in some cases and an estimate for such losses is given by:

$$\text{Power}_{Bremsstralung} = 1.67 \times 10^{-38} n^2 T^{1/2} Z_{eff} \text{ W/m}^3$$

where T is in eV and n is in $m^{-3}$ and $Z_{eff} = \Sigma Z^2 n_z/n$ where Z is the atomic number of the impurity and $n_z$ is its density. The Bremsstralung radiation power losses are a function of the square of the impurity atomic number Z, so having a low impurity content can be advantageous in some cases, especially for impurities with high atomic numbers.

Figure 4:
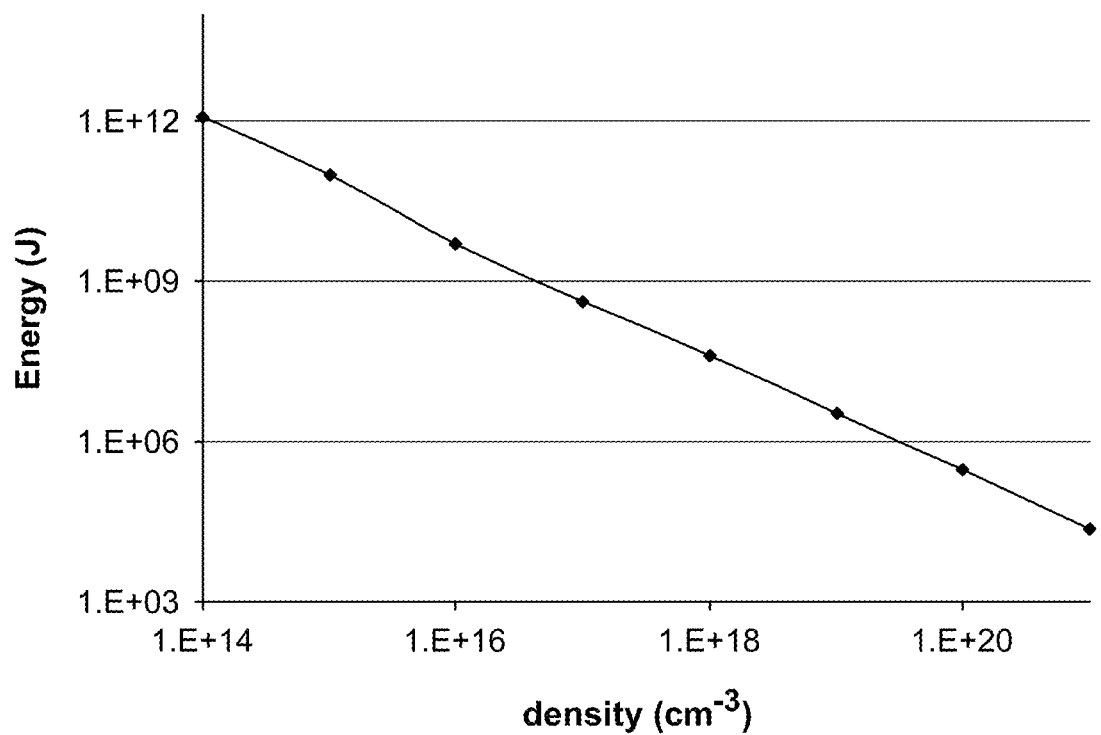
FIG. 4 is a graph showing an example calculation of the plasma energy to achieve the Lawson criteria for various plasma densities, taking into account various power losses that can occur in an example embodiment of a plasma compression system.

Continuing with this illustrative, non-limiting example calculation, dividing the energy in the plasma configuration by these various power losses gives a total plasma confinement time $\tau$. Using that confinement time it is possible to calculate the minimum plasma energy to achieve a Lawson break-even condition at various densities for this example embodiment of the system. The energy for this embodiment is shown in the graph of FIG. 4.

Note that the energy used may be more than indicated by the example graph in FIG. 2 in some implementations, because energy loss mechanisms particular to the above example embodiment have been taken into account. The graph in FIG. 4 shows that an example estimate for the minimum plasma energy used is about 3 MJ at an example density of $10^{19}$ cm$^{-3}$. Compare this to the example results shown in FIG. 2 that indicate less than about 1 MJ at this example density. The plasma outer radius R is 2.4 cm in this example calculation. The confinement time is 10 μs in this example calculation. The magnetic field is 200 Tesla, and the pressure is 0.16 Mbar, in this example calculation. A possible value for the speed of the plasma during maximum compression is just above the speed of sound, for example, about 5 km/s. Based on these example values, the plasma moves only about 50 mm during the time where the plasma temperature and pressure conditions could allow fusion to occur.

As discussed above, during and/or after the passage of the plasma, the liquid metal funnel may tend to be outwardly disrupted in some implementations of the system. In some such implementations, the system can be configured so that the liquid metal funnel will reform after a time $L_{fe}/v_f$ where $L_{fe}$ is the length of the funnel and $v_f$ is the speed at which the liquid is expelled from the nozzles (that input liquid metal into the tank 10 of the funnel system 120). These parameters can be used to determine an example estimate for the maximum pulse repetition rate in such an embodiment. In this illustrative, non-limiting example, about 1 m of the liquid metal is used to absorb most of the neutrons so, for example, a 2 m long liquid metal funnel, where the plasma temperature and pressure conditions are suitable for fusion to occur in the center, would be appropriate for some embodiments. Assuming $v_f$ is approximately 10 m/s, the repetition rate could be about 5 Hz in this example. Finally if the net energy out is of the order of the energy in, the plasma will produce approximately 3 MJ at 5 Hz yielding a power output of approximately 15 MW, which is suitable for a small power plant. Note that these estimates provide one possible estimate for the size of a power plant producing break-even in this example, and a larger plant may provide more power but may cost more to develop and build.

Continuing with this illustrative, non-limiting example, working from the conditions at maximum compression and assuming that some plasma guns 100 typically produce plasma densities not much in excess of about $10^{14}$ cm$^{-3}$, the initial plasma formation at the first end 112a of the plasma accelerator 110 would be about 2.2 m in diameter in order to provide the final 2.4 cm radius compressed plasma with a density of about $10^{19}$ cm$^{-3}$. The length of the plasma formation initially will be about 1 m, so this is about the length estimated for the formation region in this example implementation. Therefore, the ratio of the radial size of the compact toroid at the first end 112a of the accelerator 110 to the radial size of the compact toroid when the toroid is in the liquid metal funnel 8 is about 100 to 1 in this example. In other embodiments, this ratio can be different such as, for example, about 5:1, about 10:1, about 25:1, about 50:1, about 90:1, about 125:1, about 150:1, about 200:1, or some other value.

Assuming, for example, about 33% efficiency of energy transfer between the capacitors and the plasma, about 10 MJ will be used in this example. Typical fast discharge foil capacitors have an energy density of about 1 J/cm$^3$, so about 10 m$^3$ of capacitor volume is used in this example. Assuming the capacitors are 1 m high and are packed on both sides of a disk-shaped transmission line 15 associated with the plasma accelerator, a disk of about 2.2 m inside diameter and 2.6 m outside diameter is used in this example. In some embodiments, this disk transmission line plus internal inductance of the capacitors have an inductance of about 20 nH. The inductance of the plasma accelerator is about 130 nH in some implementations. Generally, the higher the voltage in the capacitor, the faster the discharge. Assuming a voltage of about 88 kV, the capacitor bank can have a capacitance of about 2.6 mF. In such an example implementation, the system will have an LC ringing time of about 100 μs. In one example implementation, for reasonable energy transfer to occur, half the ringing time (e.g., about 50 μs) should be approximately equal to the time for the plasma to accelerate down the accelerator. The final velocity advantageously can be high enough so the kinetic energy of the plasma is high enough to compress itself in the liquid metal funnel to maximum compression. Equating the example energy found above to the kinetic energy:

$$3MJ = mv^2/2$$

The mass of the plasma is its volume times the density and is about:

$$m = 2 \text{ milligrams}$$

Accordingly, in this example, a final speed of the plasma is about 1700 km/s. In order for the transit time of the plasma to equal half the ringing time, an accelerator length of about 40 m can be used in some cases. The length of the accelerator can be advantageously reduced by using a plasma restrictor at or near the first end 112a of the accelerator 110 (see, e.g., the constriction shown in FIG. 1B or the magnetic coils 23b shown in FIG. 1C). As the current increases, limited by the inductance, the plasma is unable to pass trough the constriction. In some embodiments, the system is configured such that only at or near peak current is the magnetic force strong enough to force the plasma through the constriction and rapidly accelerate the plasma. In some such embodiments, because the plasma starts accelerating only at (or near) peak current, an accelerator that is only about ¼ the length (e.g., about 10 m, in some cases) can be used. This would provide a reasonable, practical, realistic implementation of a system for compressing plasma and, in some cases, initiating fusion reactions. Implementations of such a system may have other uses as well.

Other Example Embodiments and Useful Applications

As discussed above, certain embodiments of the above-described systems and methods can be used to compress a plasma that comprises a fusionable material sufficiently that fusion reactions and useful neutron production can occur. For example, the fusionable material may comprise one or more isotopes of light elements such as, e.g., deuterium, tritium, helium-3, lithium-6, lithium-7, etc. Accordingly, certain embodiments of the system may be configured and operated to act as neutron generators or neutron sources. Neutrons so produced have a wide range of practical uses in research and industrial fields. For example, a neutron source can be used for neutron activation analysis (NAA) which can provide multi-element analysis of major, minor, trace, and rare elements in a variety of substances (e.g., explosives, drugs, fissile materials, poisons, etc.) and can be used in a variety of applications (e.g., explosive detection and identification, ecological monitoring of the environment and nuclear waste, etc.). Embodiments of the system configured as a neutron source can also be used for materials research (e.g., analyzing the structure, dynamics, composition, and chemical uniformity of materials), for non-destructive testing of industrial objects (e.g., via neutron radiography and/or neutron tomography), and for many other industrial and technological applications. For example, embodiments of the system may be used for nuclear waste remediation and generation of medical nucleotides.

Embodiments of the above-described systems and methods for plasma heating and compression are also suited for applications in the study of high energy density plasma including, for example, applications in astrophysics and nuclear physics.

Recent advances in energy storage (for example, supercapacitors) and high-power semiconductor switching have driven down the cost of high-power electrical components. Further developments in electrical pulse power systems and increasing demand for such components for a variety of applications is expected to make an electrically-driven MTF system (and/or neutron source) cost competitive with other approaches. In applications where cost is less of a factor (e.g., fusion space propulsion where a lower mass payload may be at a premium), embodiments of such an electrically-driven system may be already appealing compared to other possible technologies.

In certain implementations of the systems and methods disclosed herein, achieving plasma compression based on an electrical rather than a mechanical approach (e.g., certain piston-based systems) can, in some cases, be expected to reduce system maintenance and offer other advantages. For example, in some such implementations, the acceleration system can be configured with fewer or no moving parts and can be of lower weight. In some embodiments, synchronization issues are simplified relative to certain embodiments of a piston-based system.

While particular elements, embodiments, examples, and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, results, graphs, values, and parameters of the embodiments described herein are intended to illustrate and not to limit the disclosed embodiments. Other embodiments can be configured and/or operated differently than the illustrative examples described herein.

What is claimed is:

1. A liquid metal funnel system configured for compressing plasma, the liquid metal funnel system comprising:
 a liquid metal funnel having a passage having a first inner diameter at a first end of the passage and a second inner diameter at a second end of the passage, the second inner diameter less than the first inner diameter, the liquid metal funnel oriented such that the first end of the passage is higher than the second end of the passage; and
 a liquid guide extending along a longitudinal axis of the passage, the liquid guide spaced apart from an inner surface of the liquid metal funnel thereby providing an annular space between the inner surface of the liquid metal funnel and an outer surface of the liquid guide,
 wherein the liquid metal funnel is configured to receive a plasma from a plasma injector and to compress the plasma as the plasma moves along the annular space from the first end of the passage toward the second end of the passage.

2. The liquid metal funnel system of claim 1, wherein the system is configured such that the liquid metal funnel comprises liquid metal that flows at least partially under gravity from the first end toward the second end.

3. The liquid metal funnel system of claim 1, further comprising a liquid metal circulation system configured to circulate the liquid metal such that the liquid metal is capable of flowing from the first end to the second end.

4. The liquid metal funnel system of claim 3, wherein the liquid metal circulation system comprises a confinement system and a pump system, the liquid metal funnel disposed in the confinement system, the pump system configured to pump the liquid metal from a lower end of the confinement system to an upper end of the confinement system.

5. The liquid metal funnel system of claim 1, further comprising a liquid guide injection system configured to inject the liquid guide substantially along the axis of the passage of the liquid metal funnel.

6. The liquid metal funnel system of claim 1, wherein the liquid guide is configured to be electrically isolated from the liquid metal funnel.

7. The liquid metal funnel system of claim 1, wherein the passage has an inner surface, and a portion of the inner surface has a cross-section that is substantially circular, substantially oval, or substantially polygonal.

8. The liquid metal funnel system of claim 1, wherein the passage has a portion that is substantially cylindrical.

9. A liquid metal funnel system configured for compressing plasma, the liquid metal funnel system comprising:
 a liquid metal funnel having a passage having a first inner diameter at a first end of the passage and a second inner diameter at a second end of the passage, the second inner diameter less than the first inner diameter, the liquid metal funnel oriented such that the first end of the passage is higher than the second end of the passage; and
 a liquid guide extending along a longitudinal axis of the passage, the liquid guide spaced apart from an inner surface of the liquid metal funnel thereby providing an annular space between the inner surface of the liquid metal funnel and an outer surface of the liquid guide,
 wherein the liquid metal funnel is configured to receive a plasma having a first pressure from a plasma injector and to compress the plasma as the plasma moves along the annular space from the first end of the passage toward the second end of the passage such that the plasma at a position below the first end of the passage has a second pressure greater than the first pressure.

10. A liquid metal funnel system configured for compressing plasma, the liquid metal funnel system comprising:
 a liquid metal funnel having a passage having a first inner diameter at a first end of the passage and a second inner diameter at a second end of the passage, the second inner diameter less than the first inner diameter, the liquid metal funnel oriented such that the first end of the passage is higher than the second end of the passage; and
 a liquid guide extending along a longitudinal axis of the passage, the liquid guide spaced apart from an inner surface of the liquid metal funnel thereby providing an annular space between the inner surface of the liquid metal funnel and an outer surface of the liquid guide, wherein the liquid metal funnel is configured to receive a compact toroid plasma from a plasma injector and to compress the compact toroid plasma as the plasma moves along the annular space from the first end of the passage toward the second end of the passage.

\* \* \* \* \*

UNITED STATES PATENT AND TRADEMARK OFFICE
CERTIFICATE OF CORRECTION

PATENT NO. : 10,984,917 B2
APPLICATION NO. : 15/872585
DATED : April 20, 2021
INVENTOR(S) : Michel Georges Laberge It is certified that error appears in the above-identified patent and that said Letters Patent is hereby corrected as shown below:

In the Specification

In Column 10, Line 38, delete "LS" and insert --1.5--.

In Column 11, Line 18, delete "150; 1," and insert --150:1,--.

In Column 13, Line 53, delete "t," and insert --τ,--.

In Column 14, Line 32, delete "$\chi_{Bohm}=\rho_i v_1/16$" and insert --$\chi_{Bohm}=\rho_i v_i/16$--.

Signed and Sealed this
Twenty-seventh Day of July, 2021

Drew Hirshfeld
*Performing the Functions and Duties of the
Under Secretary of Commerce for Intellectual Property and
Director of the United States Patent and Trademark Office*